(12) United States Patent
Kim et al.

(10) Patent No.: US 11,519,609 B2
(45) Date of Patent: Dec. 6, 2022

(54) COOKING APPLIANCE

(71) Applicant: LG ELECTRONICS INC., Seoul (KR)

(72) Inventors: Hag Soo Kim, Seoul (KR); Sung Mun Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 124 days.

(21) Appl. No.: 16/739,437

(22) Filed: Jan. 10, 2020

(65) Prior Publication Data

US 2020/0224882 A1   Jul. 16, 2020

(30) Foreign Application Priority Data

Jan. 11, 2019  (KR) .................. 10-2019-0004169
Apr. 9, 2019   (KR) .................. 10-2019-0041611

(51) Int. Cl.
| | |
|---|---|
| *F24C 15/02* | (2006.01) |
| *F24C 7/08* | (2006.01) |
| *H02J 50/10* | (2016.01) |
| *H02J 50/70* | (2016.01) |
| *F24C 7/06* | (2006.01) |
| *F24C 15/00* | (2006.01) |
| *F24C 15/04* | (2006.01) |
| *F24C 15/36* | (2006.01) |
| *H05B 3/00* | (2006.01) |

(Continued)

(52) U.S. Cl.
CPC .............. *F24C 7/082* (2013.01); *F24C 7/067* (2013.01); *F24C 15/006* (2013.01); *F24C 15/023* (2013.01); *F24C 15/04* (2013.01); *F24C 15/36* (2013.01); *H02J 50/10* (2016.02); *H02J 50/70* (2016.02); *H05B 3/0014* (2013.01); *H05B 6/062* (2013.01); *H05B 6/129* (2013.01)

(58) Field of Classification Search
None
See application file for complete search history.

(56) References Cited

U.S. PATENT DOCUMENTS

| | | | |
|---|---|---|---|
| 3,108,173 A | 10/1963 | Barrett et al. | |
| 3,971,307 A * | 7/1976 | Graham | .............. A47J 37/1257 |
| | | | 99/403 |
| 4,637,373 A | 1/1987 | Shirai et al. | |

(Continued)

FOREIGN PATENT DOCUMENTS

| | | |
|---|---|---|
| AU | 199914227 B2 | 5/2001 |
| EP | 3159610 A1 | 4/2017 |

(Continued)

*Primary Examiner* — Jason Lau
(74) *Attorney, Agent, or Firm* — Dentons US LLP

(57) ABSTRACT

A cooking appliance includes a housing having a cooking compartment, which is surrounded by a bottom surface, a pair of side surfaces, and a back surface of the housing, and has an upper surface and a front surface which are open. A door includes a door upper surface part which covers the upper surface of the housing and a door front surface part which is connected to a front side of the door upper surface part and covers the front surface of the housing and opens and closes the upper surface and the front surface of the housing by rotating about a rear side of the door upper surface part. A heating part is installed in at least one of the housing or the door.

18 Claims, 19 Drawing Sheets

(51) Int. Cl.
*H05B 6/06* (2006.01)
*H05B 6/12* (2006.01)

(56) References Cited

U.S. PATENT DOCUMENTS

| | | | | |
|---|---|---|---|---|
| 2012/0325803 A1* | 12/2012 | Sasai | ........................ | H05B 3/06 |
| | | | | 219/520 |
| 2013/0206016 A1* | 8/2013 | Diaz | .................. | A47J 37/0704 |
| | | | | 99/339 |

FOREIGN PATENT DOCUMENTS

| FR | 2579869 A1 | 10/1986 |
|---|---|---|
| GB | 1495691 A | 12/1977 |
| JP | 0634137 A | 2/1994 |
| JP | 3822899 B2 | 9/2006 |
| JP | 2017-083166 A | 5/2017 |
| KR | 1995-0019486 A | 7/1995 |
| KR | 1019970011605 A | 3/1997 |
| KR | 10-2006-0062202 A | 6/2006 |
| KR | 10-2008-0024025 A | 3/2008 |
| KR | 1020090063422 A | 6/2009 |
| KR | 200450168 Y1 | 9/2010 |
| KR | 10-2011-0008423 A | 1/2011 |
| KR | 101437981 B1 | 9/2014 |
| KR | 10-2018-0095332 A | 8/2018 |
| KR | 1020180095332 A | 8/2018 |
| WO | 2019/000625 A1 | 1/2019 |

\* cited by examiner

COOKING APPLIANCE

CROSS-REFERENCE TO RELATED APPLICATION

This application claims priority to and the benefit of Korean Patent Application No. 10-2019-0004169, filed on Jan. 11, 2019, and Korean Patent Application No. 10-2019-0041611, filed on Apr. 9, 2019, the disclosure of which are incorporated herein by reference in their entirety.

BACKGROUND

1. Field of the Disclosure

The present disclosure relates to a cooking appliance, and more particularly, to a cooking appliance including a door for opening and closing a cooking compartment of an oven or the like.

2. Background

Cooking appliances, which are one kind of home appliances that may be installed in a kitchen space for cooking food according to a user's intention. Cooking appliances may be classified in various ways according to heat sources or forms used therein or types of fuels used therein.

When classified according to the form of cooking food, cooking appliances may be classified into open cooking appliances and sealed cooking appliances according to the form of a space in which food is placed. For example, sealed cooking appliances may include an oven, a microwave oven, and the like, and open cooking appliances include a cooktop, a hob, and the like.

The sealed cooking appliances are cooking appliances that cook food by sealing a space in which food is located and heating the sealed space. The sealed cooking appliances are provided with a cooking compartment which is a space in which food is placed and which is sealed when cooking the food. The cooking compartment is substantially the space in which food is cooked.

The sealed cooking appliances are broadly classified into gas ovens and electric ovens according to the type of heat source. The gas ovens use gas as a fuel and cook food using flames generated as gas is supplied to a plurality of burners, and the burners are ignited, which burns the supplied gas. Unlike the gas ovens, the electric ovens use electricity as a heat source and cook food using heat emitted from a plurality of heaters, which are heated by the electricity.

Of the gas ovens and the electric ovens, the use of the electric ovens has increased due to a faster cooking speed, higher thermal efficiency, and better stability when compared with the gas ovens. Also, reducing the size of the electric ovens is easier than reducing the size of the gas ovens. Accordingly, the electric ovens in the form of mini ovens having a small size (hereinafter referred to as "mini ovens") have also been released.

The mini ovens have a small size, and thus are not suitable for cooking food of a large size but are suitable for baking or warming a small amount of food which does not require the use of large-capacity ovens.

Particularly, the mini ovens have advantages of being conveniently usable in toasting bread. In addition, the mini ovens are usable in cooking a small amount of food or food having a small size. Accordingly, the use of the mini ovens as cooking appliances for replacing conventional toasters has increased.

In general, the mini oven includes an outer case for accommodating all its components, a plurality of shelves for placing food during cooking, and a cooking compartment having an open front surface through which food may be placed in the cooking compartment and cooked.

Also, the mini oven includes an oven heater for heating food to an appropriate temperature and a door for opening and closing the cooking compartment.

The door may be provided so that, while food is placed in the cooking compartment and cooked, the inside of the cooking compartment is closed from the outside environment and sealed. The door may include a handle for easily opening and closing the door and a glass window for viewing the inside of the cooking compartment without opening the door.

In the mini oven, the door is mostly provided as a downward opening type. That is, the door of the mini oven may have a lower end portion rotatably coupled to the outer case through a door hinge. The door opens the cooking compartment by rotating downward about the lower end portion rotatably coupled to the outer case and closes the cooking compartment by rotating upward when the cooking compartment is open.

The door may open the cooking compartment by rotating at an angle of about 90° when the cooking compartment is closed, and the shelves may be withdrawn or inserted while the cooking compartment is opened by the door.

That is, the door is opened in a state of being substantially parallel to the shelves inserted into the mini oven, and the withdrawal and insertion of the shelves are directly performed by the user.

However, the mini oven having the above configuration has the following disadvantages.

First, there is a problem in that, when the door is opened, the door inevitably protrudes from the front of the mini oven by as much as a height of the door. Thus, the opening of the door and the withdrawal and insertion of the shelves are difficult when the mini oven is installed in a narrow space.

Second, there is a problem in that, when the door is opened, the door protrudes from the front of the mini oven by as much as the height of the door, and the center of mass of the mini oven is biased towards the front.

Due to the characteristics of the mini oven being lightweight as well as having a small size, the center of mass of the mini oven is inevitably biased towards the front when the door opens forward from the mini oven. In this case, there is an increased risk that the mini oven may topple forward.

Particularly, when the shelves are withdrawn, the shelves are often placed on the door for checking a cooking state or temporarily placing the shelves. In such a structure in which the center of mass of the mini oven is biased towards the front, the risk of the mini oven toppling forward is inevitably increased.

Furthermore, the risk is greater when the weight of the shelves or foods placed on the shelves are heavy. This not only adds risks to the cooking of heavyweight foods but also causes an increase in the weight of the shelves. That is, even when it is necessary to adopt shelves formed of a thick, heavy material to improve the cooking performance, adopting such shelves becomes difficult due to the risk of the mini oven toppling forward.

Third, various limitations occur because a passage for the withdrawal and insertion of the shelves and a passage for checking the cooking state are limited to the front side of the mini oven.

That is, since the directions of the withdrawal and insertion of the shelves are limited to a front-rear direction, inconvenience occurs during the withdrawal and insertion of the shelves when the mini oven is installed at a low place. Since the passage for checking the cooking state is limited to the glass window provided in the door, there is considerable inconvenience in checking the cooking state when the mini oven is installed at a low place.

Fourth, since the withdrawal and insertion of the shelves is performed by the user directly pulling the shelves from the inside of the cooking compartment or pushing the shelves into the cooking compartment, the inconvenience of the user and the risk of safety accidents are increased.

In some cases, the user may want to withdraw the shelves and directly check the overall cooking state during cooking. In this case, the user has to directly hold the shelves and withdraw the shelves after opening the door. In the case in which the user wants to resume cooking, the user has to directly hold the shelves and push the shelves into the cooking compartment.

That is, even when the user simply wants to check the cooking state, the user is inconvenienced by having to directly withdraw and insert the shelves, and, during this process, the user may be exposed to the risk of injury such as burns.

Particularly, during this process, the center of mass of the mini oven may be biased towards the front, and the mini oven may topple forward. In this case, the safety of the user may be seriously threatened.

SUMMARY

One aspect is to provide a cooking appliance having a low risk of toppling forward when the door is opened and capable of facilitating withdrawal and insertion of a tray.

Another aspect is to provide a cooking appliance having high structural stability and capable of facilitating checking of a cooking state.

The disclosure describes a cooking appliance according to one embodiment of the present invention that includes a housing with open upper and front surfaces and a door which rotates about a rear side thereof connected to the housing to open and close the upper surface and the front surface of the housing.

The door may open a front surface and an upper surface of a cooking compartment by rotating upward without being unfolded forward.

The cooking appliance may include the housing having the cooking compartment, which is surrounded by a bottom surface, both side surfaces, and a back surface of the housing, formed therein and having the open upper and front surfaces; the door including a door upper surface part which covers the upper surface of the housing and a door front surface part which is connected to a front side of the door upper surface part and covers the front surface of the housing and opening and closing the upper surface and the front surface of the housing by rotating about a rear side of the door upper surface part; a tray disposed in the cooking compartment; and a heating part installed in the housing and/or the door.

The cooking appliance having the above configuration includes the door which is able to open both the front surface and the upper surface of the cooking compartment by rotating upward without being unfolded forward. In this way, there are advantageous effects in that the opening of the door may be easily and smoothly performed even in a narrow space and the withdrawal of food or the tray may be more easily and conveniently performed.

In a conventional door structure of a cooking appliance in which only a front surface of a cooking compartment is opened, since movement of an object to be cooked is limited or the field of view is occluded by an upper surface of a case, for putting the object to be cooked in a tray or taking the object to be cooked out of the tray, the tray has to be withdrawn forward to a great extent so that the object to be cooked is exposed, and thus a risk of the cooking appliance toppling forward is high. On the other hand, in the cooking appliance of the present disclosure, since both the front surface and the upper surface of the cooking compartment may be opened by the door and a tray part is exposed to a greater extent due to the opening of the door, an object to be cooked may be easily put in or taken out even when only a portion of the tray is withdrawn. Thus, improved convenience and stability may be provided.

Also, a first heating part may include an electric heater installed at the door upper surface part and disposed at an upper portion of the tray, the cooking appliance may further include an input part disposed at the door front surface part and a first control board disposed at the door front surface part, an inside of the door upper surface part and an inside of the door front surface part may be connected to each other, and the first control board may be electrically connected to the input part and the first heating part through the inside of the door upper surface part and the inside of the door front surface part which are connected to each other.

By such a configuration, elements suitable to be disposed in the door may be disposed at optimal positions that allow the elements to function optimally, have high structural stability, have neat and simple wiring configurations, and efficiently avoid interference therebetween.

The door may further include a see-through window disposed at the door upper surface part, and the first heating part may be disposed in a region in which, when viewed from the top, the first heating part is not exposed through the see-through window.

By such a configuration, since the user may view the inside of the cooking compartment from the top through the see-through window formed at an upper portion of the cooking appliance, there is an advantageous effect in that the user is allowed to easily and conveniently check a cooking state of food without lowering the posture or bending the waist forward.

The door may further include a see-through window disposed at the door upper surface part, the see-through window may include a pair of glasses disposed to be spaced a predetermined distance apart from each other in an up-down direction so that a space portion is formed in the see-through window, the first heating part may include an electric heater installed at the door upper surface part and disposed at an upper portion of the tray, the cooking appliance may further include an input part disposed at the door front surface part and a first control board disposed at the door front surface part, a space portion which accommodates at least a portion of the input part and the first control board therein may be formed in the door front surface part, the space portion formed inside the door front surface part and the space portion formed inside the see-through window may be connected to each other, and an air intake port which opens the space portion inside the door front surface part to the outside may be formed at a lower end of the door front surface part, and an air exhaust port which opens the space portion inside the see-through window to the outside may be formed at a rear end of the door upper surface part.

By such a configuration, there are advantageous effects in that, since the occurrence of overheating and deterioration of components inside the door such as the first control board is suppressed, the occurrence of breakdown of the cooking appliance, deterioration of performance of the cooking appliance, etc., may be effectively suppressed, and the occurrence of accidents in which the user suffers an injury such as a burn due to coming into contact with the see-through window may be effectively reduced.

The heating part may include a second heating part disposed at a lower portion of the tray, the second heating part may include an induction heating part installed at the bottom surface of the housing, an inner space at a lower portion of the bottom surface of the housing and an inner space at the rear of the back surface of the housing may be connected to each other, and the cooking appliance may further include a second control board which is installed at the back surface of the housing and electrically connected to the induction heating part through the inner space at the lower portion of the bottom surface of the housing and the inner space at the rear of the back surface of the housing which are connected to each other.

By such a configuration, elements suitable to be disposed in the housing may be disposed at optimal positions that allow the elements to function optimally, have high structural stability, have neat and simple wiring configurations, and efficiently avoid interference therebetween.

In the present disclosure, the second heating part may further include a receiver coil which is disposed at a lower portion of the second heating part and receives wirelessly-transmitted power, the induction heating part may include a working coil which is installed at the lower portion of the bottom surface of the housing and inductively heats an upper portion of the bottom surface of the housing, the second control board may include a chip which controls the working coil and a power processing part to which the power is supplied, and the receiver coil may be electrically connected to the second control board.

By such a configuration, since the cooking appliance does not require untidy power cables and thus may be provided in a simple and neat exterior, and the cooking appliance may be operated by wirelessly receiving power just by being placed on a cooktop, and the user's satisfaction may be further improved.

In the present disclosure, the cooking appliance may further include a hinge assembly which withdraws the tray forward from the inside of the cooking compartment by interlocking with rotation of the door when the door is opened and inserts the tray rearward toward the inside of the cooking compartment by interlocking with rotation of the door when the door is closed.

By such a configuration, since the tray may be automatically withdrawn or inserted when the door is opened or closed, a function of allowing the withdrawal and insertion of food or the tray to be more easily and conveniently performed may be provided.

BRIEF DESCRIPTION OF THE DRAWINGS

The above and other aspects, features and advantages of the present disclosure will become more apparent to those of ordinary skill in the art by describing exemplary embodiments of the present invention in detail with reference to the accompanying drawings, in which.

DETAILED DESCRIPTION OF EXEMPLARY EMBODIMENTS

Figure 1:
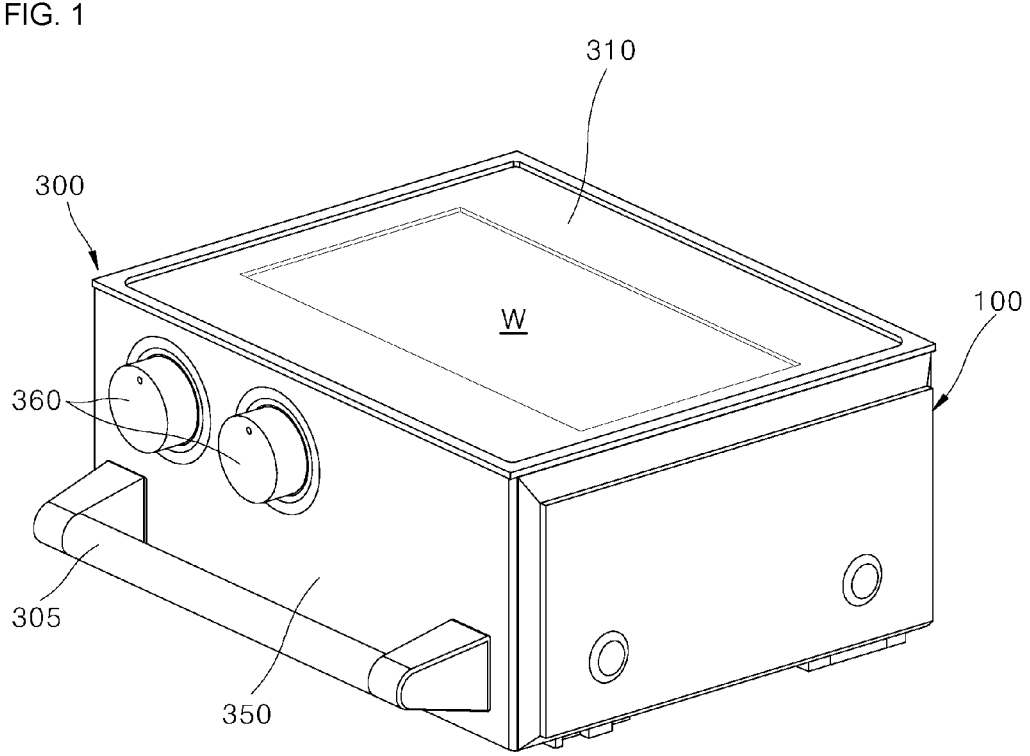
FIG. 1 is a perspective view illustrating a cooking appliance according to an embodiment of the present invention.

The above-mentioned aspects, features, and advantages will be described in detail with reference to the accompanying drawings, and accordingly, those of ordinary skill in the art should be able to easily practice the technical aspects of the present disclosure. In describing the exemplary embodiments of the present invention, when detailed description of known art related to the present disclosure is deemed as having a possibility of unnecessarily blurring the gist of the present disclosure, the detailed description may be omitted. Hereinafter, exemplary embodiments according to the present invention will be described in detail with reference to the accompanying drawings. Like reference numerals in the drawings may refer to like or similar elements throughout.

Terms such as first and second are used to describe various elements, but the elements are of course not limited by the terms. The terms are merely used for distinguishing one element from another element, and a first element may also be a second element unless particularly described otherwise.

Hereinafter, when it is said that an arbitrary element is disposed at "an upper portion (or a lower portion)" of an element or disposed "above (or below)" an element, this may not only mean that the arbitrary element is disposed in contact with an upper surface (or a lower surface) of the element, but also mean that another element may be interposed between the element and the arbitrary element disposed above (or below) the element.

Also, when it is said that a certain element is "connected" or "coupled" to another element, this may mean that the elements are directly connected or coupled to each other, but it should be understood that another element may be "interposed" between the elements or the elements may be "connected" or "coupled" to each other via another element.

Through the specification, each element may be singular or plural unless particularly described otherwise.

A singular expression used herein encompasses a plural expression unless the context clearly indicates otherwise. In the present disclosure, terms such as "consisting of" or "including" should not be interpreted as necessarily including all of various elements or various steps described herein and should be interpreted as indicating that some of the elements or some of the steps may not be included or additional elements or steps may be further included.

Throughout the specification, "A and/or B" may refer to A, B, or A and B unless particularly described otherwise, and "C to D" refers to C or more and D or less unless particularly described otherwise.

Figure 2:
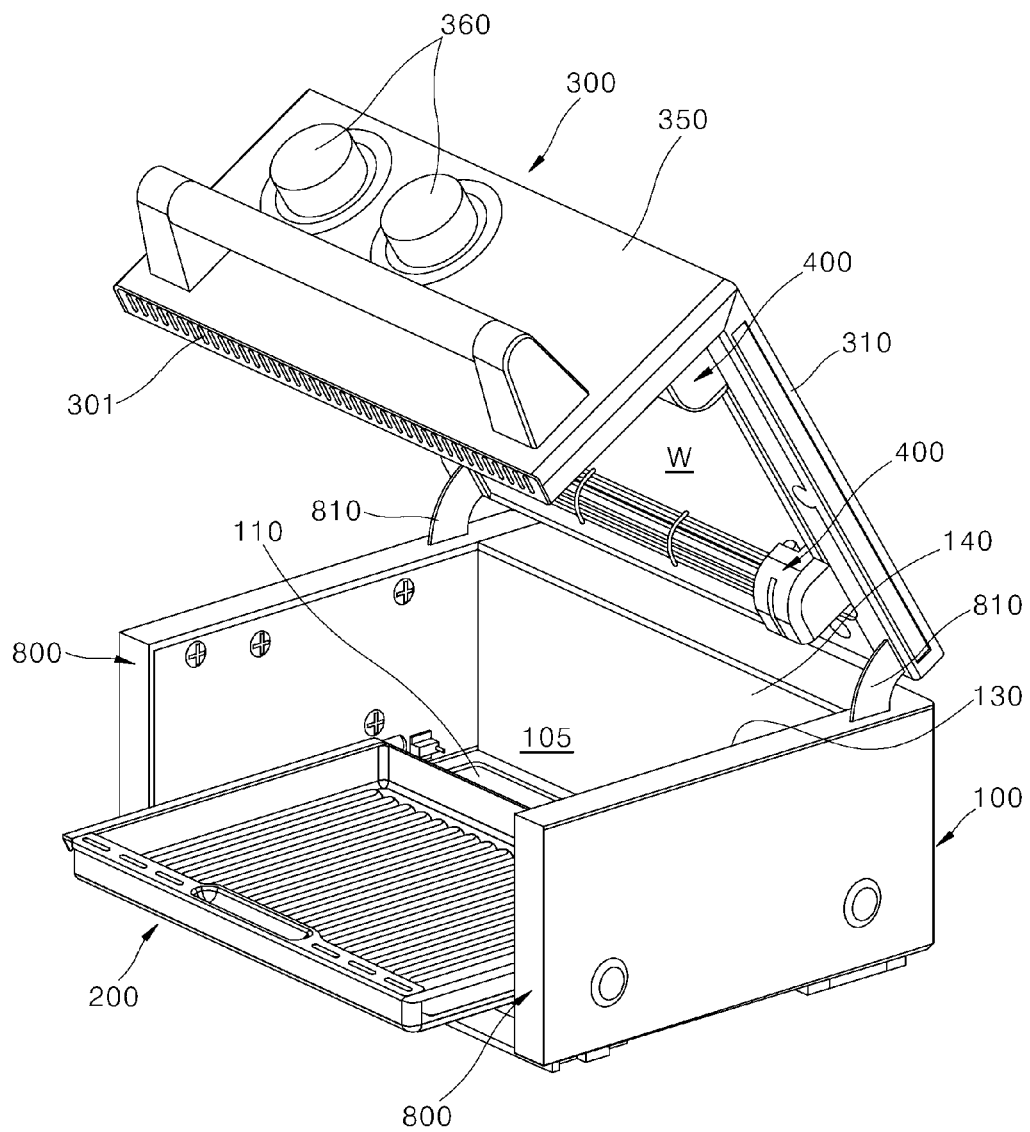
FIG. 2 is a perspective view illustrating a door-opened state of the cooking appliance illustrated in FIG. 1.
Figure 3:
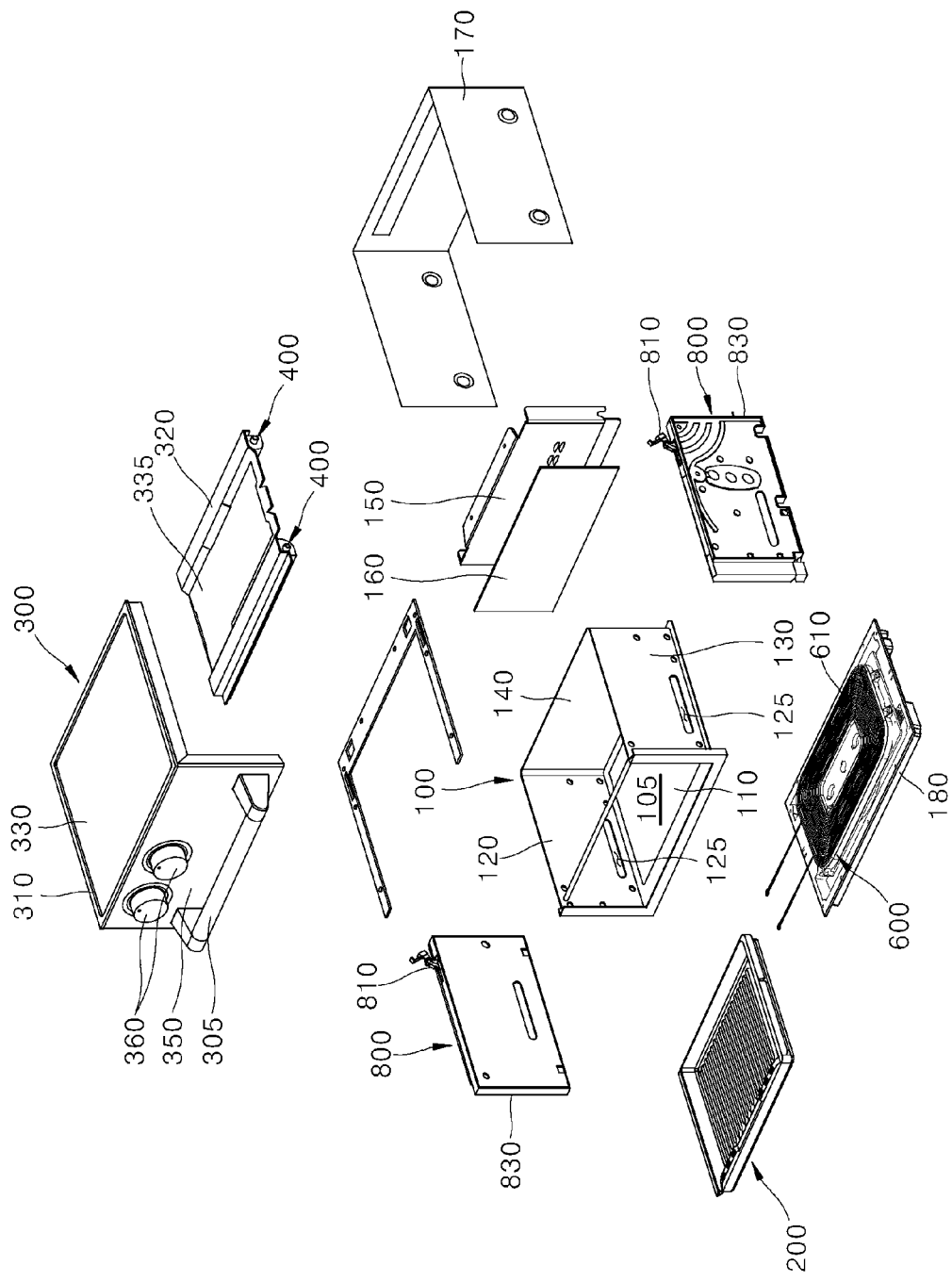
FIG. 3 is an exploded perspective view illustrating an exploded state of the cooking appliance illustrated in FIG. 1.

FIG. 1 is a perspective view illustrating a cooking appliance according to an embodiment of the present invention, FIG. 2 is a perspective view illustrating a door-opened state of the cooking appliance illustrated in FIG. 1, and FIG. 3 is an exploded perspective view illustrating an exploded state of the cooking appliance illustrated in FIG. 1.

Referring to FIGS. 1 to 3, the cooking appliance according to an embodiment of the present invention may include a housing 100, a door 300, a tray 200, and a heating part.

The housing 100 forms a frame of the cooking appliance according to the present embodiment. According to this, various components constituting the cooking appliance are installed in the housing 100. A cooking compartment 105 which provides a space for cooking food is formed inside the housing 100.

In the present embodiment, the housing 100 is illustrated as being formed in a hexahedral shape with open upper and front surfaces. That is, the housing 100 includes a bottom surface 110, a pair of side surfaces 120 and 130, and a back surface 140, which forms a space therein, and is provided in the form in which the upper surface and the front surface may open. The cooking compartment 105 surrounded by the bottom surface 110, the both side surfaces 120 and 130, and the back surface 140 of the housing 100 is formed inside the housing 100.

The tray 200 is disposed in the cooking compartment 105 inside the housing 100. The tray 200 is provided so that an object to be cooked is seated thereon. The tray 200 may be detachably installed inside the cooking compartment 105. Also, for convenience of a user, the tray 200 may be provided to be withdrawable from the front side of the cooking compartment 105.

The tray 200 may be installed to be movable in a front-rear direction by interlocking with an operation of opening or closing the door 300, and the movement of the tray 200 in the front-rear direction may be guided by a hinge assembly 800 which will be described below.

The door 300 is provided to open or close the open upper and front surfaces of the housing 100. In the present embodiment, the housing 100 forms an exterior of a bottom surface, side surfaces, and a back surface of the cooking appliance while the door 300 forms an exterior of an upper surface and a front surface of the cooking appliance. The door 300 may include a door upper surface part 310 and a door front surface part 350.

The door upper surface part 310 forms an upper surface of the door 300 and corresponds to an element which covers the open upper surface of the housing 100 when the door 300 closes the cooking compartment 105 inside the housing 100. Also, the door front surface part 350 forms a front surface of the door 300 and corresponds to an element which covers the open front surface of the housing 100 when the door 300 closes the cooking compartment 105.

In the present embodiment, the door 300 is illustrated as being formed in an L-shape. That is, at the door 300, the door upper surface part 310 forming the upper surface of the door 300 and the door front surface part 350 forming the front surface of the door 300 are formed in the form of being connected to each other in an L-shape. The door 300 formed in this way opens or closes the cooking compartment 105 as the door upper surface part 310 and the door front surface part 350 connected to each other in an L-shape rotate together when the door 300 rotates for opening or closing the cooking compartment 105.

The door 300 is rotatably installed at an upper portion of the housing 100 and is rotatably coupled to the housing 100 via the hinge assembly 800 installed at the housing 100. In this case, the hinge assembly 800 is disposed at each side portions of the housing 100, and a rear side of the door upper surface part 310 is rotatably coupled to the hinge assembly 800.

That is, a left side corner portion and a right side corner portion at the rear side of the door upper surface part 310 are rotatably coupled to the hinge assembly 800 disposed at the both side portions of the housing 100. The door 300 opens or closes the upper surface and the front surface of the housing 100 by rotating in an up-down direction about the rear side of the door upper surface part 310 rotatably coupled to the hinge assembly 800.

Also, a handle 305 may be provided at the front surface of the door 300, and a user may open or close the cooking compartment 105 by holding the handle 305 and rotating the door 300 in the up-down direction.

The heating part may be installed at the housing 100 or the door 300 to heat the tray 200 disposed in the cooking compartment 105. The heating part may include a first heating part 400 disposed at the door 300.

The first heating part 400 is installed at the door 300 such that, when the door 300 closes the cooking compartment 105, the first heating part 400 is accommodated inside the cooking compartment 105. The first heating part 400 is installed at the door upper surface part 310 in such a way that the first heating part 400 is disposed at a bottom surface side of the door upper surface part 310 facing the bottom surface of the housing 100.

In the present embodiment, the first heating part 400 is illustrated as being provided in the form including an electric heater. The first heating part 400 may heat the object to be cooked which is seated on the tray 200 from an upper portion of the object.

Further, the heating part may include a second heating part 600. In the present embodiment, the heating part is illustrated as including both the first heating part 400 and the second heating part 600, but the present invention is not limited thereto. As another example, the heating part may only include the first heating part 400 or only include the second heating part 600. In this way, various embodiments may be possible regarding the heating part.

The second heating part 600 is installed at the housing 100 such that the second heating part 600 is disposed at a lower portion of the tray 200. The second heating part 600 is provided in the form of a heating part which heats the tray 200 using a different heating method from the first heating part 400, e.g., an induction heating part.

The second heating part 600 may be provided in the form including a working coil 610 installed at a lower portion of the bottom surface 110 of the housing 100 and may induce heating of the tray 200 from the lower portion of the bottom surface 110. To this end, the tray 200 may be formed of a material which may be inductively heated by the second heating part 600.

In summary, the cooking appliance according to the present embodiment includes the housing 100 in which the cooking compartment 105 is formed, the door 300 provided to be able to simultaneously open the front and the top of the cooking compartment 105, the first heating part 400 provided to be able to heat the inside of the cooking compartment 105 from the top, and the second heating part 600 provided to be able to inductively heat the tray 200 inside the cooking compartment 105, wherein the withdrawal and insertion of the tray 200 may be performed by interlocking with the operation of opening or closing the door 300.

Detailed descriptions of the above-mentioned elements and other elements not mentioned yet will be sequentially given below.

Figure 4:
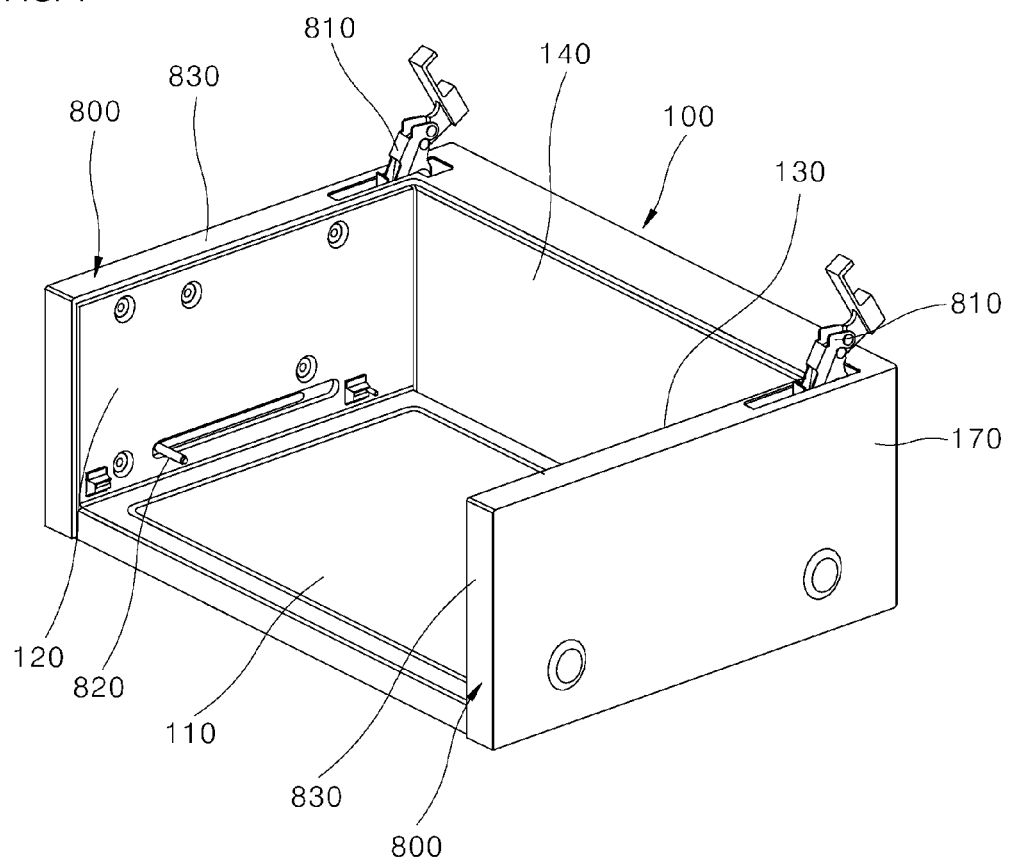
FIG. 4 is a perspective view separately illustrating a housing and a hinge assembly illustrated in FIG. 1.

FIG. 4 is a perspective view separately illustrating a housing and a hinge assembly illustrated in FIG. 1.

Referring to FIGS. 3 and 4, as described above, the housing 100 includes the bottom surface 110, the pair of side surfaces 120 and 130, and the back surface 140, which forms a space therein, and is provided in the form in which the upper surface and the front surface are open.

The cooking compartment 105 may be formed in the inner space surrounded by the bottom surface 110, the both side surfaces 120 and 130, and the back surface 140 of the housing 100, and the tray 200 may be installed in the cooking compartment 105 so as to be withdrawable therefrom.

Also, the second heating part 600 may be installed at the lower portion of the bottom surface of the housing 100, and an electronic component, e.g., a second control board 700 which will be described below, related to operation of the second heating part 600 may be installed at the rear of the back surface of the housing 100.

Further, the hinge assembly 800 may be installed at outer sides of the side surfaces 120 and 130 of the housing 100, and the door 300 may be rotatably installed at the housing 100 by being coupled to the hinge assembly 800 installed as above.

For example, the housing 100 may be manufactured in the form in which a metal plate is bent in an angular U-shape and the bent metal plate forms the bottom surface and the both side surfaces of the housing 100. When the housing 100 is manufactured in this form, the bottom surface 110 of the housing 100 may be integrally connected to the both side surfaces 120 and 130 thereof without joints.

In this way, not only the esthetic sense of the inside of the cooking compartment 105 is improved, but also it is possible to obtain an advantageous effect of preventing the occurrence of contamination of the second heating part 600 due to foreign substances being stuck in a gap between the bottom surface 110 of the housing 100 and the both side surfaces 120 and 130 thereof or foreign substances being expelled through the gap.

As another example, the housing 100 may be manufactured in the form in which a metal plate includes a left protruding portion and a right protruding portion forming a T-shape which are folded upward to form the bottom surface 110 and the both side surfaces 120 and 130 of the housing 100 and a rear side protruding portion of the metal plate is folded upward to form the back surface 140 of the housing 100. When the housing is manufactured in this form, the bottom surface 110, the both side surfaces 120 and 130, and the back surface 140 of the housing 100 may be integrally formed without joints between the bottom surface 110 and the both side surfaces 120 and 130 of the housing 100 and between the bottom surface 110 and the back surface 140 of the housing 100.

In this way, when viewed from the front and top, the joints inside the cooking compartment 105 are almost not visible and an inner side surface of the cooking compartment 105 may be maintained as a smooth flat surface. As a result, not only the esthetic sense of the inside of the cooking compartment 105 is further improved, but also it is possible to obtain an advantageous effect of facilitating the removal of contaminants from the inner side surface of the cooking compartment 105.

Meanwhile, the bottom surface 110 of the housing 100 may be formed including ceramic glass, and the ceramic glass may be formed in the shape of a rectangular flat plate having a predetermined thickness.

For example, the ceramic glass may be disposed at a cut central portion of the bottom surface 110 formed of a metal material, and the ceramic glass may be disposed between the second heating part 600 and the tray 200.

Also, a back surface case 150 which accommodates the second control board 700 which will be described below is disposed at the rear of the back surface 140 of the housing 100. The second control board 700 is accommodated in the back surface case 150 and installed at the rear of the housing 100, and an insulating plate 160 is disposed between the back surface 140 of the housing 100 and the back surface case 150.

The insulating plate 160 serves to block transfer of hot air from the inside of the cooking compartment 105 to the second control board 700 via the back surface 140 of the housing 100 and insulate the housing 100 and the back surface case 150, in which the second control board 700 is installed, from each other.

Further, the housing 100 of the present embodiment may further include a cabinet 170. The cabinet 170 is provided to cover the both side surfaces 120 and 130 and the back surface 140 of the housing 100. The cabinet 170 may surround and protect the hinge assembly 800 installed at the both side surfaces 120 and 130 of the housing 100 and the second control board 700 installed at the back surface 140 of the housing 100 from the outside and form an exterior of the side portions and the rear of the cooking appliance.

Figure 5:
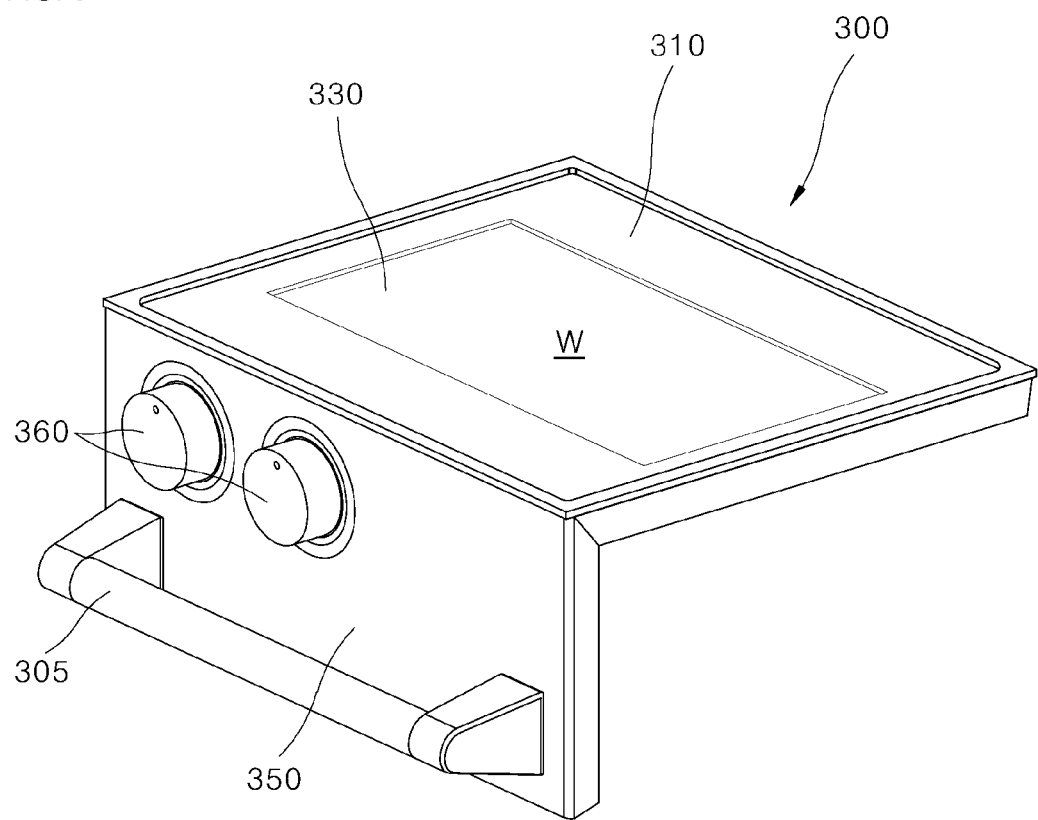
FIG. 5 is a perspective view separately illustrating a door according to an embodiment of the present invention.
Figure 6:
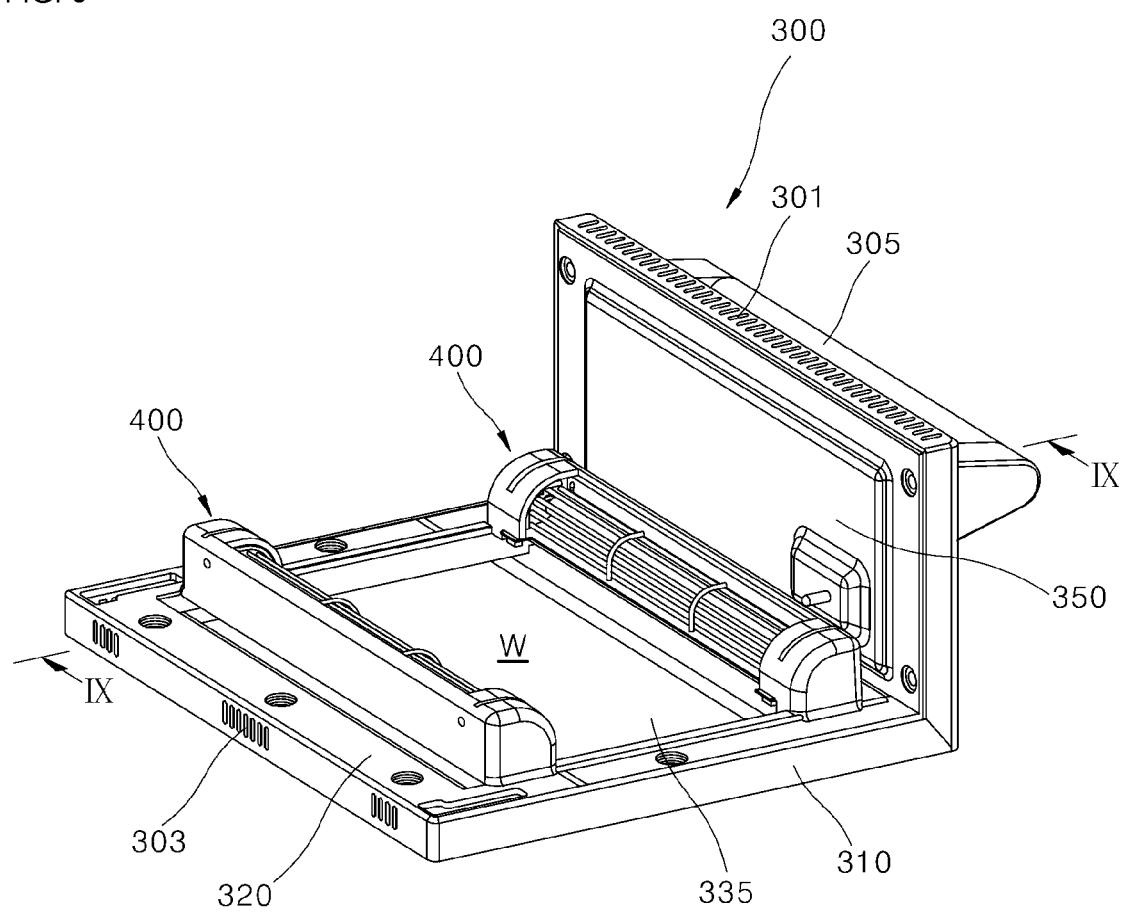
FIG. 6 is a bottom perspective view illustrating a bottom surface side of the door illustrated in FIG. 5.
Figure 7:
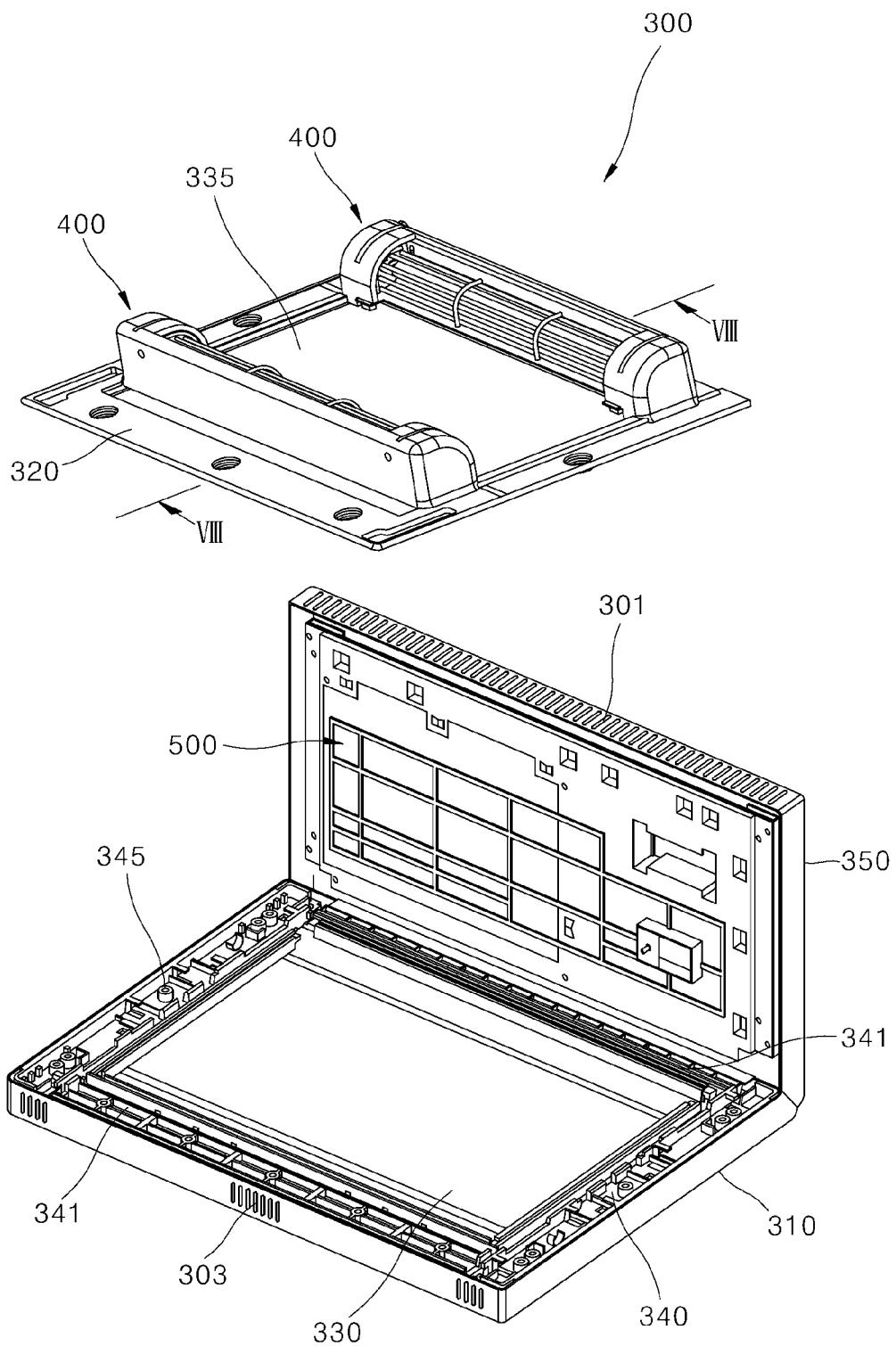
FIG. 7 is an exploded perspective view illustrating a configuration of the door illustrated in FIG. 6 in an exploded manner.
Figure 8:
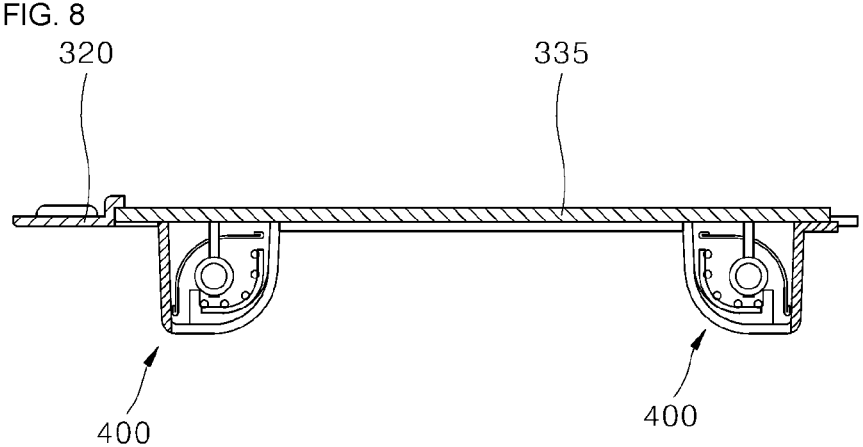
FIG. 8 is a cross-sectional view taken along line "VIII-VIII" of FIG. 7.
Figure 9:
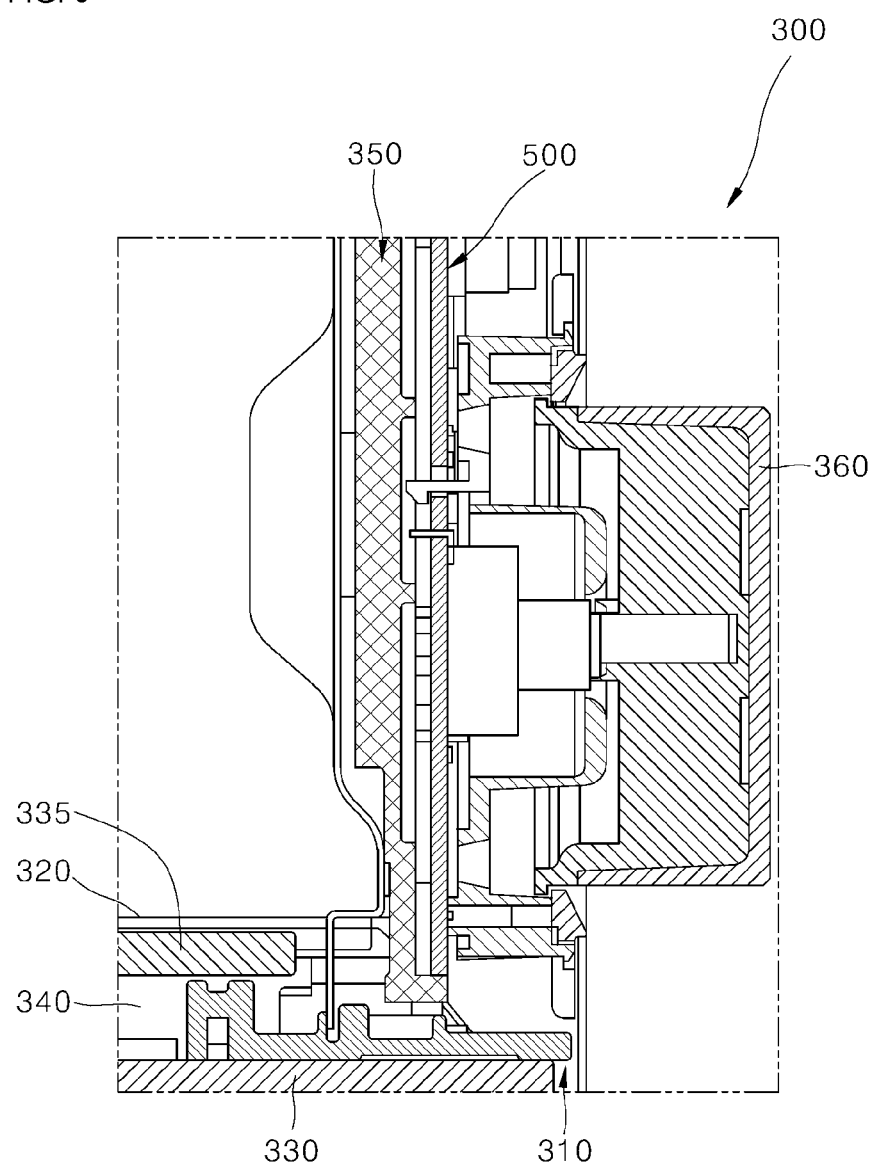
FIG. 9 is a cross-sectional view taken along line "IX-IX" of FIG. 6.

FIG. 5 is a perspective view separately illustrating a door according to an embodiment of the present invention, and FIG. 6 is a bottom perspective view illustrating a bottom surface side of the door illustrated in FIG. 5. Also, FIG. 7 is an exploded perspective view illustrating configuration of the door illustrated in FIG. 6 in an exploded manner, and FIG. 8 is a cross-sectional view taken along line "VIII-VIII" of FIG. 7. Also, FIG. 9 is a cross-sectional view taken along line "IX-IX" of FIG. 6.

Referring to FIGS. 5 to 9, the door 300 is provided in the form in which the door upper surface part 310 forming the upper surface of the door 300 and the door front surface part 350 forming the front surface of the door 300 may be integrally connected to each other in an L-shape.

The door upper surface part 310 may be formed in a quadrilateral shape such that the door upper surface part 310 is formed in a rectangular shape in which a front-rear length is longer than a left-right length. A door frame 320 may be installed at the door upper surface part 310. The door frame 320 may be installed at a lower portion of the door upper surface part 310, and the first heating part 400 may be installed at the lower portion of the door upper surface part 310 while being coupled to the door frame 320.

The door 300 may include a see-through window W. The see-through window W may be disposed at the door upper surface part 310 such that the see-through window W is provided to be located at a central portion of the door upper surface part 310 in a planar direction. The see-through window W may be formed including a pair of glasses 330 and 335 which are disposed to be spaced a predetermined distance apart from each other in the up-down or vertical direction to form a space portion therein. For example, of the glasses 330 and 335, the glass 330 may be installed at the door upper surface part 310, and the other glass 335 may be installed at the door frame 320.

The user may view the inside of the cooking compartment 105 from the top through the see-through window W formed as above, and in this way, a cooking state of food inside the cooking compartment 105 may be checked. Due to characteristics of a mini oven, the cooking appliance of the present embodiment is often used at a point which is significantly lower than the user's face. Therefore, the see-through window W formed at the upper surface of the door 300 may be provided as a means that allows the user to easily and conveniently check the cooking state of food without lowering their posture or bending their waist forward.

Further, the pair of glasses 330 and 335 forming the see-through window W are coupled to different elements, that is, one is coupled to the door upper surface part 310 and the other is coupled to the door frame 320, and are disposed to be spaced a predetermined distance from each other. Accordingly, the space portion or simply "space" between the two glasses 330 and 335 is formed inside the see-through window W.

An air layer formed in the space portion formed as above serves to block transfer of heat, which has heated the glass 335 directly exposed to the cooking compartment 105, to the glass 330 disposed at the door upper surface part 310.

In this way, the see-through window W provided in the double-window structure as described above has a function of preventing, to a significant level, the occurrence of safety accidents caused by the overheating of the see-through window W, the occurrence of steaming up of the see-through window W due to a temperature rise of the see-through window W, and the like.

Meanwhile, the first heating part 400 is installed at the door upper surface part 310 in such a way that the first heating part 400 is disposed in a region not exposed through the see-through window W when viewed from the top. The first heating part 400 is disposed at a front portion and a rear portion of the see-through window W, in particular at a front outer side and a rear outer side of the see-through window W on a plane in a horizontal direction formed by the door upper surface part 310. That is, the cooking appliance of the present embodiment may include a pair of first heating parts 400 disposed at the front outer side and the rear outer side of the see-through window W.

When the first heating part 400 is disposed in a region exposed through the see-through window W, it is aesthetically not desirable. Also a problem may occur in securing the field of view through the see-through window W, and a problem in that a temperature of a portion of the see-through window W rises may also occur.

Also, in consideration of the shape of the door front surface part 350 having a rectangular shape in which a front-rear length is longer than a left-right length, the first heating part 400 should be disposed at the front outer side and the rear outer side of the see-through window W for a length of the first heating part 400 to be increased accordingly, and improvement in thermal power of the first heating part 400 may be expected in proportion to the increase in the length of the first heating part 400.

In consideration of such aspects, the first heating part 400 is disposed at each of the front outer side and the rear outer side of the see-through window W. In this way, it may be advantageous to secure functional advantages such as maintaining aesthetics, maintaining a secured field of view, suppressing a temperature rise of the see-through window W, and improving the thermal power of the first heating part 400.

The door front surface part 350 may be formed in a rectangular shape like the door upper surface part 310. However, when the door upper surface part 310 forms a plane in the horizontal direction, the door front surface part 350 forms a plane in a vertical direction.

For example, the door front surface part 350 may be formed in the form extending downward from a front portion, a front end or a front end portion of the door upper surface part 310. Also, the door front surface part 350 and the door upper surface part 310 may be connected in the form in which an inner space of the door front surface part 350 and an inner space of the door upper surface part 310 are connected to each other. That is, the door 300 may be provided in the form in which the door front surface part 350 and the door upper surface part 310, whose inner spaces are connected to each other, are integrally connected in an L-shape.

An input part 360 and a first control board 500 may be disposed in the door front surface part 350. In the present embodiment, a space portion is illustrated as being formed inside the door front surface part 350 (see FIG. 9). In the space portion, at least a portion of the input part 360 and the first control board 500 may be accommodated.

The input part 360 may be formed including various manipulation switches for controlling and manipulating operation of the cooking appliance according to the present embodiment. For example, the input part 360 may be formed including a manipulation switch for controlling on/off states or thermal power of the first heating part 400, a manipulation switch for controlling on/off states or thermal power of the second heating part 600, a timer manipulation switch for controlling operation time of the first heating part 400 or the second heating part 600 (see FIG. 3), and the like. The input part 360 may be provided to be exposed at the front surface of the door front surface part 350, and the user may directly manipulate the input part 360 to control operation of the cooking appliance.

The first control board 500 is installed inside the door front surface part 350. Various elements and circuits related to reception of manipulation signals input via the input part 360, generation of control signals for controlling operations of the first heating part 400 and the second heating part 600, and the like are provided in the first control board 500.

The first control board 500 may be electrically connected to the input part 360, the first heating part 400, and the second heating part 600. The first control board 500 is disposed in the door front surface part 350 like the input part 360 and may be disposed at a position very close to the input part 360. The first control board 500 may be disposed at a position which is also very close to the first heating part 400 disposed on the door 300.

According to the present embodiment, the input part 360 may be electrically connected to the first control board 500 in the form of being directly mounted on the first control board 500, and the first heating part 400 may be electrically connected to the first control board 500 via a cable installed through the inside of the door front surface part 350 and the inside of the door upper surface part 310 which are connected to each other.

That is, since the first control board 500, the input part 360, and the first heating part 400 which have to be electrically connected to one another are disposed at positions very close and spatially connected to one another, not only is it possible to easily and promptly perform a task for electrically connecting the first control board 500, the input part 360, and the first heating part 400, but also it is possible to maintain a connection structure thereof in a very stable state.

Also, the cooking appliance of the present embodiment may further include cable mounting parts 340 and 345. The cable mounting parts 340 and 345 are disposed between the door upper surface part 310 and the door frame 320, which are disposed in the up-down or vertical direction, in such a way that the cable mounting parts 340 and 345 are disposed at outer portions, in particular both outer sides of the see-through window W.

Further, a connecting member 341 is disposed at each of the front outer side and the rear outer side of the see-through window W. The pair of connecting members 341 connect the pair of cable mounting parts 340 and 345 spaced apart from each other. That is, the pair of cable mounting parts 340 and 345 and the pair of connecting members 341 may be provided in a frame shape or square shape surrounding the see-through window W from the outside.

An assembly of the cable mounting parts 340 and 345 and the connecting members 341 provided as above is installed in the door upper surface part 310 in the form of being inserted into the space portion formed between the door upper surface part 310 and the door frame 320.

The space portion of the door upper surface part 310, in particular the inside of the door upper surface part 310, in which the cable mounting parts 340 and 345 are installed as described above is connected to the space portion of the door front surface part 350, in particular the inside of the door front surface part 350. Also, cables which connect the first control board 500 and the first heating part 400 through the inside of the door upper surface part 310 and the inside of the door front surface part 350, which are connected to each other, are installed at the cable mounting parts 340 and 345 installed in the door upper surface part 310.

A power cable which supplies power to the first heating part 400 and the first control board 500 may be installed at any one of the cable mounting parts 340 and 345 disposed at both outer sides of the see-through window W. Also, a signal cable which transmits a control signal generated in the first control board 500 to the first heating part 400 may be installed at the other one of the cable mounting parts 340 and 345 disposed at both outer sides of the see-through window W.

That is, in the door 300, the first heating part 400 is disposed at both sides of the see-through window W in the front-rear direction, and the power cable and the signal cable are disposed at both sides of the see-through window W in the left-right direction.

The arrangement structure of the first heating part 400, the power cable, and the signal cable is a result of designing in consideration of the arrangement structure of the first heating part 400 and the hinge assembly 800.

According to the present embodiment, each first heating part 400 is disposed in the form in which a heating element thereof extends longitudinally in the left-right direction. Also, the hinge assembly 800 (see FIG. 2) is disposed at both sides of the see-through window W in the left-right direction.

Figure 21:
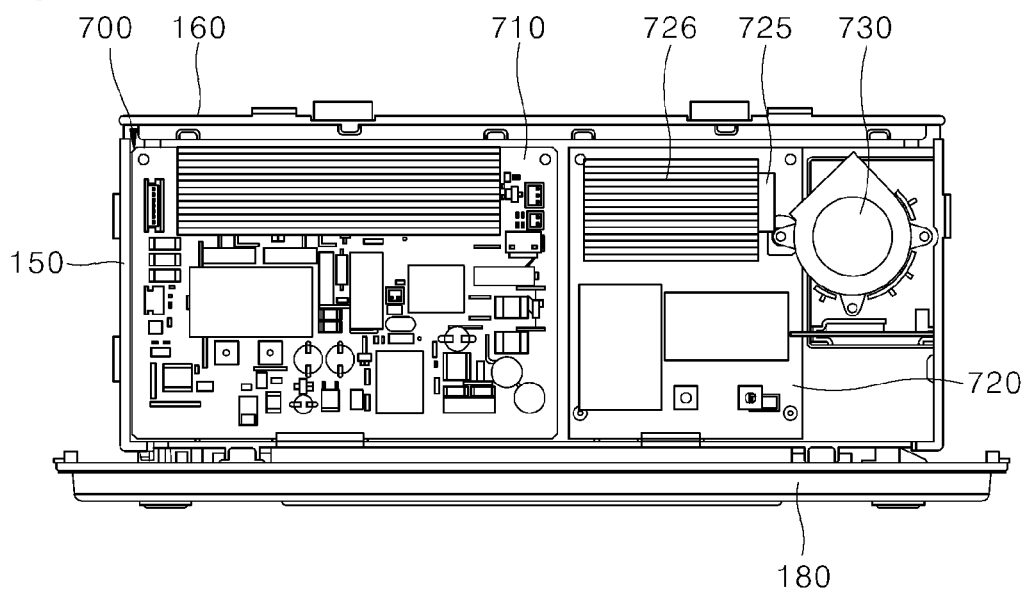
FIG. 21 is a rear view illustrating a second control board illustrated in FIG. 17.

The power cable and the signal cable are not only connected to the elements disposed in the door 300 such as the first heating part 400 and the first control board 500, but also connected to the elements disposed in the housing 100 such as the second control board 700 (see FIG. 21).

In order to pass through a portion between the door 300 and the housing 100 with the least possible exposure to the outside, the power cable and the signal cable may pass through the portion in which the hinge assembly 800 is disposed, which is a connecting portion between the door 300 and the housing 100.

For example, sections of the power cable and the signal cable connecting the housing 100 and the door 300 to each other may be disposed in the form of passing through the inside of the hinge assembly 800. In this way, exposure of the power cable and the signal cable to the outside of the cooking appliance may be suppressed in a section between the housing 100 and the door 300, and the power cable and the signal cable may be protected from the risk of damage.

Further, considering that the heating element of the first heating part 400 extends longitudinally in the left-right direction, the power cable and the signal cable may be disposed at the farthest possible side from the heating element and disposed to extend in a direction different from a direction in which the heating element extends.

This is a result of designing to avoid an influence of heat generated in the first heating part 400 on the power cable and the signal cable. Also, considering that a plurality of first heating parts 400 are disposed to be spaced apart from each other in the front-rear direction, a structure in which the power cable and the signal cable are disposed at both sides of the first heating parts 400 in the left and right direction may be advantageous for connecting the first heating parts 400 using the power cable and the signal cable.

Also, in the present embodiment, the power cable and the signal cable may be disposed to be spaced apart from each other in the left-right direction with the see-through window W disposed therebetween and may be installed at the cable mounting parts 340 and 345 different from each other.

In this case, the power cable passes through the inside of any one of the hinge assemblies 800 disposed at both side surfaces of the housing 100 and is installed at the cable mounting parts 340 and 345 adjacent thereto. Also, the signal cable passes through the inside of the other one of the hinge assemblies 800 disposed at both side surfaces of the housing 100 and is installed at the cable mounting parts 340 and 345 adjacent thereto.

For example, the power cable may pass through the inside of the hinge assembly 800 disposed at the left side of the housing 100 and be installed at the cable mounting parts 340 and 345 disposed at the left side of the door 300. Also, the signal cable may pass through the inside of the hinge assembly 800 disposed at the right side of the housing 100 and be installed at the cable mounting parts 340 and 345 disposed at the right side of the door 300.

Through the structure in which the cables having different functions are disposed at different positions, a wiring task for electrically connecting the components constituting the cooking appliance may be more easily and promptly performed, and maintenance and repair tasks related thereto may also be easily performed.

Figure 10:
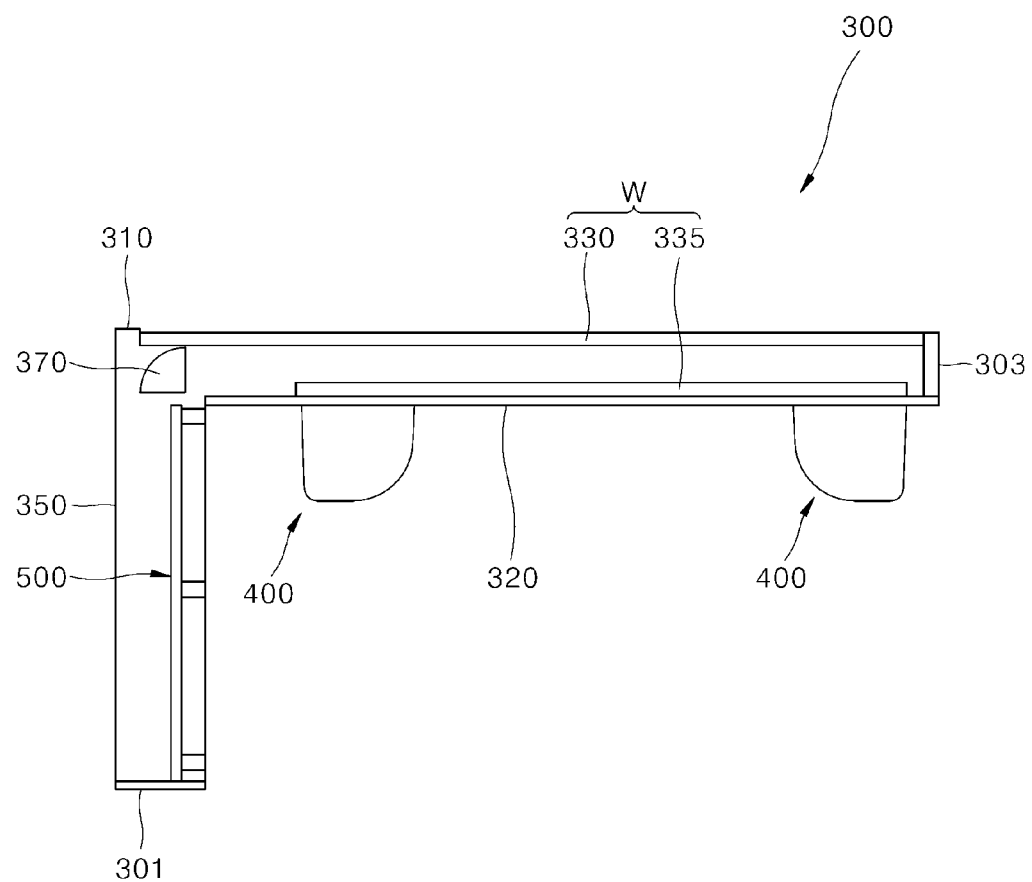
FIG. 10 is a cross-sectional view schematically illustrating a flow of air inside the door according to an embodiment of the present invention.

FIG. 10 is a cross-sectional view schematically illustrating a flow of air inside the door according to an embodiment of the present invention.

Referring to FIG. 10, a space portion is formed inside each of the door upper surface part 310 and the door front surface part 350. Particularly, a space portion is formed between the pair of glasses 330 and 335, which are disposed to be spaced a predetermined distance apart from each other in the up-down or vertical direction, inside the see-through window W installed in the door upper surface part 310. Also, the space portion inside the door upper surface part 310 including the see-through window W and the space portion inside the door front surface part 350 are connected to each other.

An air intake port 301 is formed at a lower end of the door front surface part 350. The air intake port 301 is formed to pass through the lower end of the door front surface part 350 and forms a passage which opens the space portion inside the door front surface part 350 to the outside on the door front surface part 350.

An air exhaust port 303 is formed at a rear end of the door upper surface part 310. The air exhaust port 303 is formed to pass through the rear end of the door upper surface part 310 and forms a passage which opens the space portion inside the door upper surface part 310 to the outside on the door upper surface part 310.

Further, the cooking appliance of the present embodiment may further include a first cooling fan 370 disposed inside the door 300. The first cooling fan 370 may be installed inside the door upper surface part 310 or inside the door front surface part 350. In the present embodiment, the first cooling fan 370 is illustrated as being installed in the space portion inside the door front surface part 350.

Since the see-through window W, the first heating part 400, and the like are installed in the door upper surface part 310, available space in the door upper surface part 310 may be limited. In contrast, since components which account for occupying a large space are not disposed in the door front surface part 350 except for the first control board 500, the door front surface part 350 may have a relatively more available space than the door upper surface part 310. As a result of designing in consideration of such an aspect, the first cooling fan 370 may be installed inside the door front surface part 350.

The first cooling fan 370 provided as above generates a flow of air which causes outside air to be introduced into the door 300 via the air intake port 301 and causes air inside the door to be discharged via the air exhaust port 303.

By the flow of air generated by the first cooling fan 370 as above, the outside air is introduced into the door front surface part 350 via the air intake port 301, and the outside air introduced into the door front surface part 350 cools the first control board 500. Also, the air which has cooled the first control board 500 is introduced into the door upper surface part 310, passes through the space portion inside the see-through window W, and then is discharged to the outside of the door 300 via the air exhaust port 303.

During operation of the cooking appliance, the temperature of the first control board 500 is at a level significantly lower than the temperature of the see-through window W heated by the first heating part 400. Therefore, the air which has cooled the first control board 500 after being introduced into the door 300 via the air intake port 301 may pass through the inside of the see-through window W while the temperature of the air is sufficiently low for cooling the see-through window W. Therefore, the cooling of the first control board 500 and the cooling of the see-through window W may be sufficiently efficiently performed by the flow of air generated by the first cooling fan 370.

By the cooling structure inside the door 300 formed as above, the occurrence of overheating and deterioration of the components inside the door 300 such as the first control board 500 is suppressed. In this way, the occurrence of breakdown of the cooking appliance, deterioration of performance of the cooking appliance, etc., may be effectively suppressed.

Also, since the cooling air passing through the inside of the door 300 blocks heat transfer between the pair of glasses 330 and 335 constituting the see-through window W and suppresses the occurrence of overheating of the see-through window W, the occurrence of accidents in which the user suffers an injury such as a burn due to coming into contact with the see-through window W may be effectively reduced.

Figure 11:
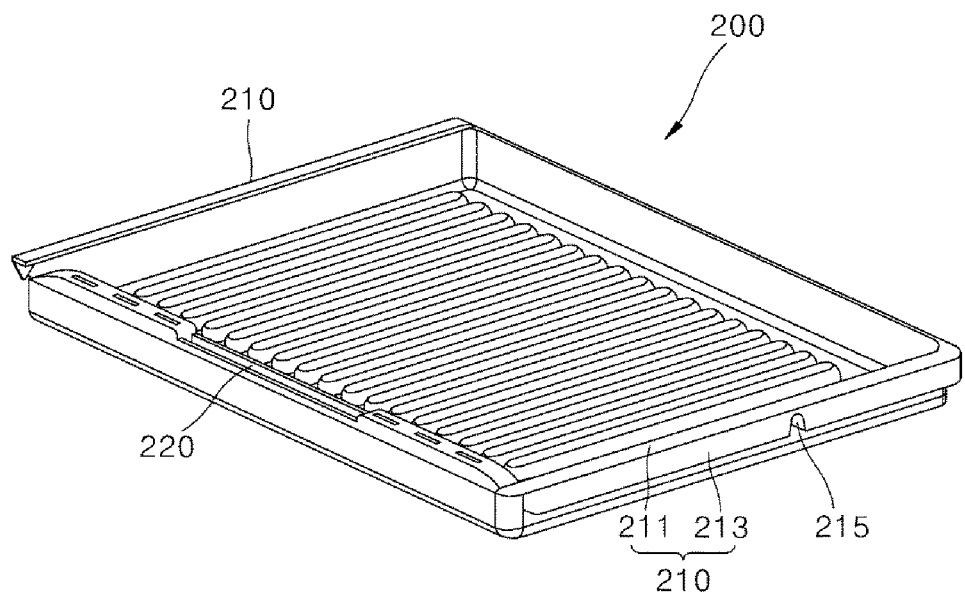
FIG. 11 is a perspective view illustrating a tray according to an embodiment of the present invention.
Figure 12:
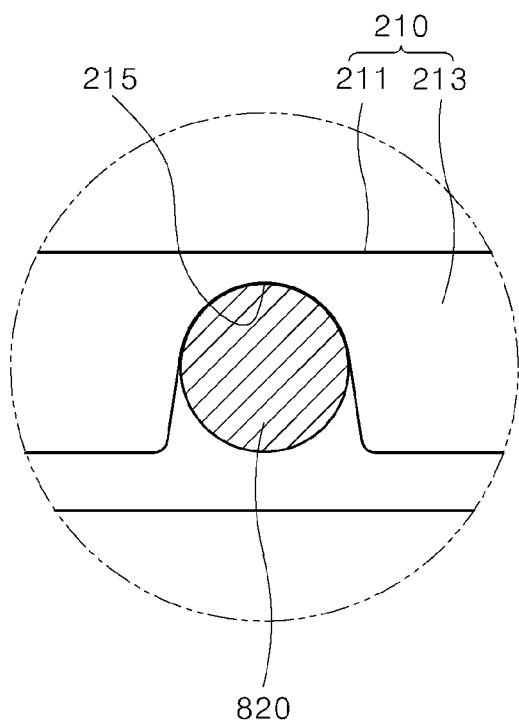
FIG. 12 is a cross-sectional view schematically illustrating a coupling structure between the tray illustrated in FIG. 11 and a mounting protrusion.
Figure 13:
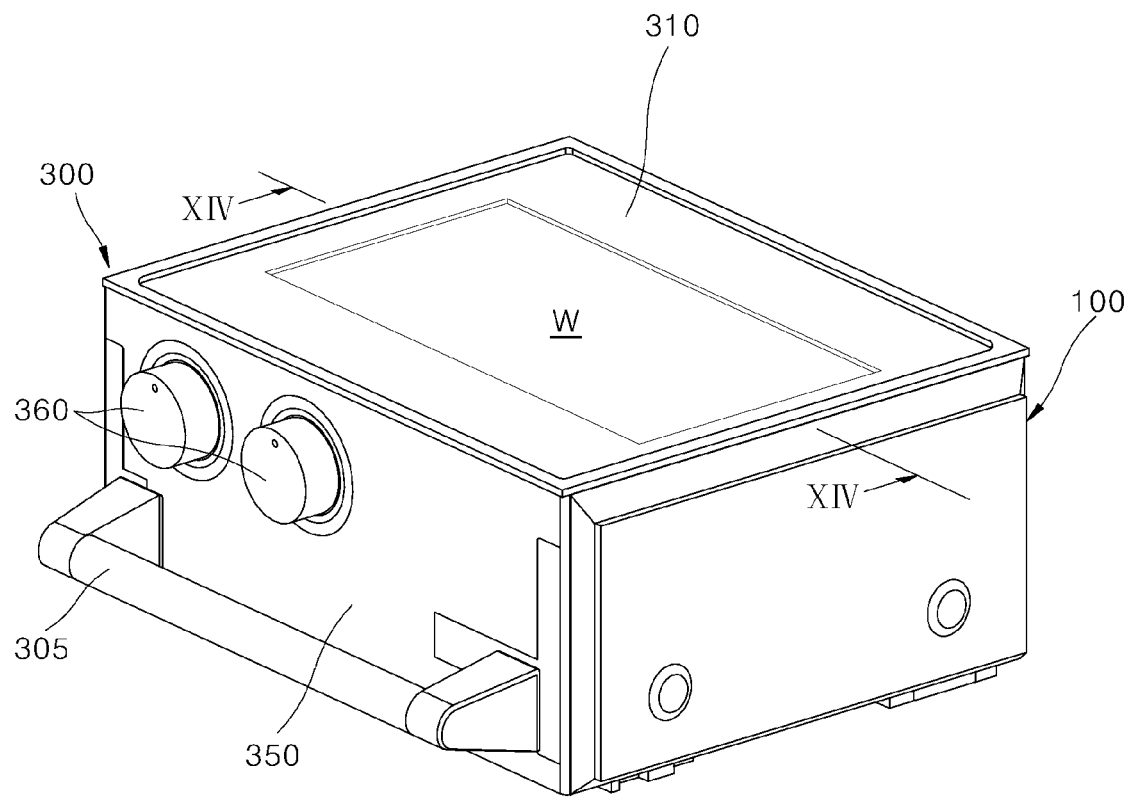
FIG. 13 is a perspective view illustrating a door-closed state of the cooking appliance according to an embodiment of the present invention.
Figure 14:
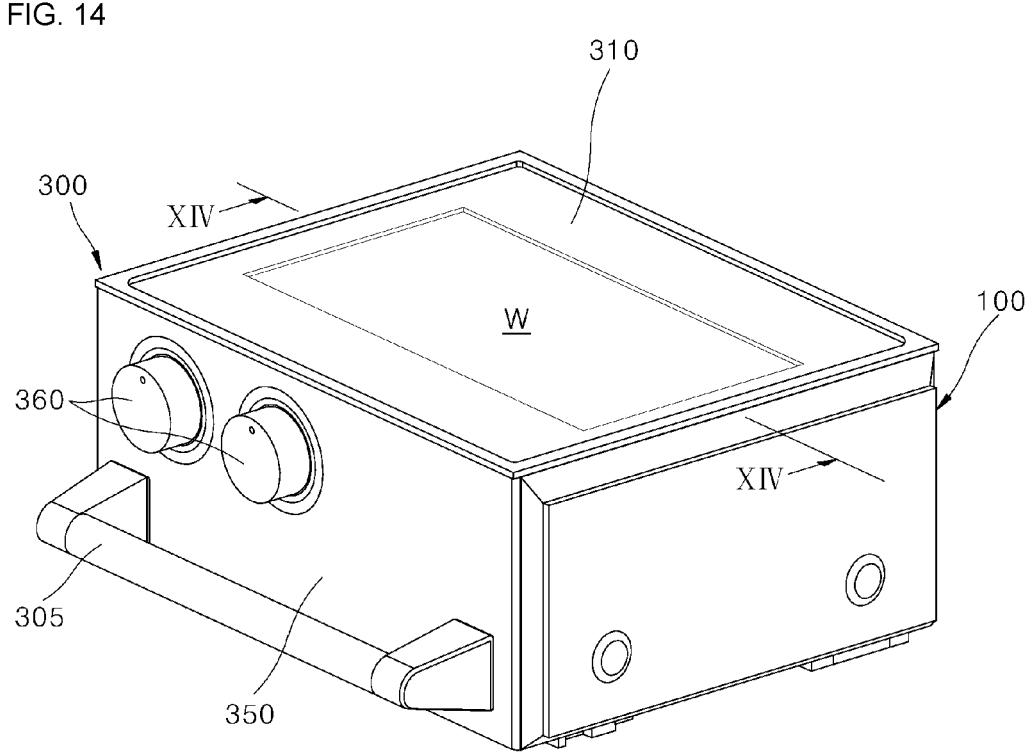
FIG. 14 is a cross-sectional view taken along line "XIV-XIV" of FIG. 13.
Figure 15:
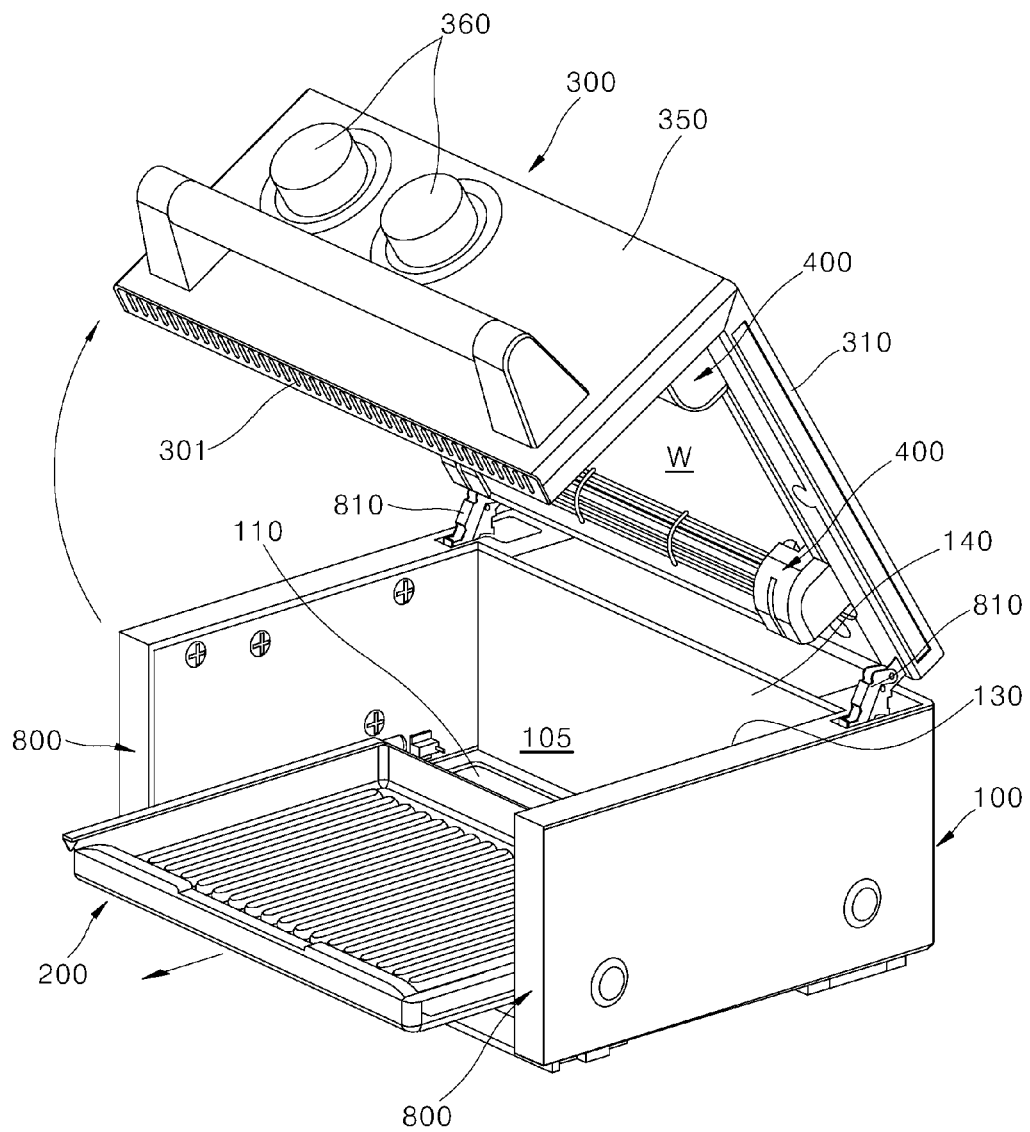
FIG. 15 is a perspective view illustrating a door-opened state of the cooking appliance illustrated in FIG. 13.
Figure 16:
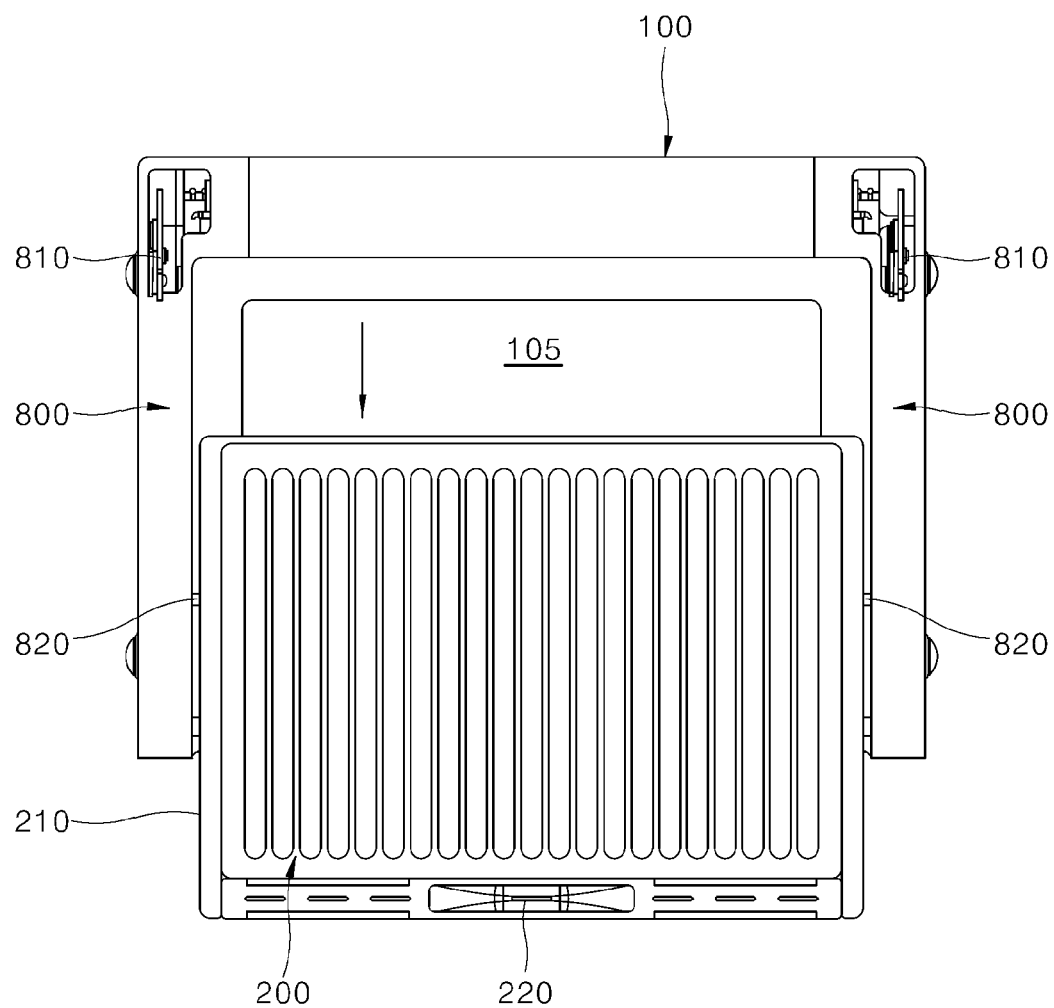
FIG. 16 is a cross-sectional view taken along line "XVI-XVI" of FIG. 15.

FIG. 11 is a perspective view illustrating a tray according to an embodiment of the present invention, and FIG. 12 is a cross-sectional view schematically illustrating a coupling structure between the tray illustrated in FIG. 11 and a mounting protrusion. Also, FIG. 13 is a perspective view illustrating a door-closed state of the cooking appliance according to an embodiment of the present invention, and FIG. 14 is a cross-sectional view taken along line "XIV-XIV" of FIG. 13. Also, FIG. 15 is a perspective view illustrating a door-opened state of the cooking appliance illustrated in FIG. 13, and FIG. 16 is a cross-sectional view taken along line "XVI-XVI" of FIG. 15.

Referring to FIGS. 2 and 3 and FIGS. 11 and 12, the tray 200 is disposed in the cooking compartment 105 formed inside the housing 100. The tray 200 may be installed to be movable in the front-rear direction by interlocking with an operation of opening or closing the door 300, and the movement of the tray 200 in the front-rear direction may be guided by the hinge assembly 800.

The tray 200 may be formed including a tray main body and a mounting part 210.

The tray main body has a bottom surface formed in a shape corresponding to the bottom surface 110 of the housing 100. In the present embodiment, the tray main body is illustrated as being formed in the shape of a box which has an open upper portion and is flat in the up-down or vertical direction. The bottom surface of the tray main body is formed in a shape corresponding to the bottom surface 110 of the housing 100, e.g., the shape of a quadrilateral plate, and four side surfaces of the tray 200 are formed in the form of extending upward from edges of the bottom surface of the tray 200.

The mounting part 210 is provided at each of side surfaces facing both side surfaces of the housing 100 in the left-right direction among the four side surfaces of the tray 200. The mounting part 210 may be formed including a first protrusion 211 protruding toward the outside of the tray 200 from an upper end portion of the side surface of the tray 200 and a second protrusion 213 extending downward from an outer end portion of the first protrusion 211. For example, the mounting part 210 may be formed in which the first protrusion 211 and the second protrusion 213 are connected to each other in an L-shape.

A mounting groove 215 is formed in the mounting part 210 provided at each of side surfaces of the tray 200. The mounting groove 215 may be formed in which a groove is cut out from the mounting part 210, more specifically, from a lower end of the second protrusion 213. A mounting protrusion 820 which will be described below may be fitted into the mounting groove 215, and the tray 200 and the mounting protrusion 820 may be fitted and coupled to each other by the mounting groove 215.

Further, a water receiving groove 220 may be formed in the tray 200. The water receiving groove 220 may be disposed in at least one of the four side surfaces of the tray 200. In the present embodiment, the water receiving groove 220 is illustrated as being disposed in the side surface disposed at the front of the tray 200.

The water receiving groove 220 may be formed as a groove which is concavely depressed downward from an upper end of the side surface of the tray 200. Water may be held in the water receiving groove 220, and the water held in the water receiving groove 220 may be evaporated when the inside of the cooking compartment 105 or the tray 200 is heated and then be provided as steam acting in the cooking compartment 105.

The hinge assembly 800 interlocks with rotation of the door 300 and causes the tray 200 to be withdrawn forward from the inside of the cooking compartment 105 when the door is opened. Also, the hinge assembly 800 may interlock with the rotation of the door 300 and cause the tray 200 to be inserted inward towards the inside of the cooking compartment 105 when the door is closed.

The hinge assembly 800 may be installed at both sides of the housing 100 in the left-right direction so that the hinge assembly 800 is disposed at each of outer sides of the tray 200 in the left-right direction. Also, each hinge assembly 800 may be formed including a hinge part 810 and the mounting protrusion 820.

The hinge part 810 is provided to be hinge-coupled to the rear side of the door upper surface part 310. The hinge part 810 may be formed including a plurality of connecting members mechanically connected to each other, and the connecting members may be connected by connection using a hinge, connection using a rack and a pinion or a cam for converting rotary movement into linear movement, and the like.

Most of the connecting members constituting the hinge part 810 may be accommodated inside a hinge case 830. Also, the connecting member directly connected to the rear side of the door upper surface part 310 may be exposed to the outside of the hinge case 830 and be hinge-coupled to the door upper surface part 310 at the outside of the hinge case 830. Also, the connecting member disposed at an end among the connecting members accommodated inside the hinge case 830 may be connected to the mounting protrusion 820.

A state of the hinge part 810 configured in the above-described form is changed by the hinge part 810 interlocking with rotation of the door 300. In the present embodiment, it is illustrated that states of the connecting members are changed so that, when rotation of the door 300 occurs, the hinge part 810 may convert a rotary force transmitted due to the rotation of the door 300 to a linear force which causes the mounting protrusion 820 to move in the front-rear direction. That is, the hinge part 810 is provided so that the states of the connecting members may be changed by rotation of the door 300 and the connecting members whose states are changed may cause the mounting protrusion 820 to move in the front-rear direction.

A first slot 835 (see FIG. 3) may be formed in one side surface of the hinge case 830 facing the side surfaces 120 and 130 of the housing 100 and the tray 200. The first slot 835 may be formed to pass through the one side surface of the hinge case 830 while being formed to extend in the front-rear direction. The first slot 835 forms, on the hinge case 830, a passage which allows the mounting protrusion 820 connected to one of the connecting members of the hinge part 810 inside the hinge case 830 to protrude to the outside of the hinge case 830 and a passage which allows the mounting protrusion 820 to move in the front-rear direction.

The mounting protrusion 820 is connected to one of the connecting members of the hinge part 810 inside the hinge case 830 and protrudes toward the inside of the cooking compartment 105 via the first slot 835 formed in the hinge case 830 and a second slot 125 formed in the housing 100 (see FIG. 3). Here, the second slot 125 may be formed in a side surface of the housing 100 and formed with a shape overlapping the first slot 835 and at a position overlapping the first slot 835.

The tray 200 may be mounted on the mounting protrusion 820. Specifically, the tray 200 may be mounted on the mounting protrusion 820 by the mounting protrusion 820 being fitted to the mounting groove 215 formed in the side portion of the tray 200 (see FIG. 12).

The mounting groove 215 is formed in the mounting part 210 provided at each of side surfaces of the tray 200. The mounting groove 215 may be formed in which a groove is cut out from the mounting part 210, more specifically, from the lower end of the second protrusion 213. The mounting protrusion 820 may be fitted into the mounting groove 215, and the tray 200 and the mounting protrusion 820 may be fitted and coupled to each other by the mounting groove 215.

The mounting protrusion 820 may be moved in the front-rear direction by interlocking with a change in a state of the hinge part 810. The mounting protrusion 820 may cause the tray 200 mounted on the mounting protrusion 820 to move in the front-rear direction. That is, the tray 200 mounted on the mounting protrusion 820 may interlock with the movement of the mounting protrusion 820 in the front-rear direction and be moved in the front-rear direction.

According to the present embodiment, in a state in which the cooking compartment 105 is closed by the door 300 as illustrated in FIGS. 13 and 14, the tray 200 is inserted into the cooking compartment 105. Also, the mounting protrusion 820 on which the tray 200 is mounted is disposed at a position biased towards the rear side of the cooking compartment 105.

As illustrated in FIGS. 15 and 16, when the door 300 rotates upward to open the cooking compartment 105, a rotary force due to the rotation of the door 300 changes the state of the hinge part 810 of the hinge assembly 800, and the mounting protrusion 820 moves forward as a result. Also, the tray 200 may move forward due to the mounting protrusion 820 moving forward and be withdrawn to the outside of the cooking compartment 105.

That is, when the door 300 is opened, the tray 200 is automatically withdrawn. Accordingly, the user may easily and safely put food to be cooked on the tray 200 or take out the cooked food on the tray 200 from the tray 200 and may easily take out the tray 200, which has withdrawn forward, from the inside of the cooking compartment 105 and move the tray 200.

Further, in the cooking appliance of the present embodiment, the door 300 is provided to be able to open both the front surface and the upper surface of the cooking compartment 105. Accordingly, the user may insert or withdraw food or the tray 200 into or from the cooking compartment 105 through a much larger opening as compared with a cooking appliance where the door only opens at the front side of the cooking compartment 105.

That is, the cooking appliance of the present embodiment may not only provide a much larger opening for allowing the user to easily and conveniently insert or withdraw food or the tray 200 into or from the cooking compartment 105 but also provide a function of allowing the food or the tray 200 to be more easily and conveniently withdrawn by the automatic withdrawal of the tray 200 when the door 300 is opened.

The cooking appliance of the present embodiment may also provide a function of allowing the tray 200 to be automatically inserted into the cooking compartment 105 when the door 300 is closed as long as the tray 200 is mounted on the mounting protrusion 820. The function may contribute to improving convenience and safety of the cooking appliance by eliminating the need for the user to put their hand inside the cooking compartment 105 filled with hot air when the user wants to put the tray 200 back into the cooking compartment 105 after taking out the tray 200 from the cooking compartment 105 while cooking is performed.

Further, according to the cooking appliance of the present embodiment, since the door 300 is opened by rotating upward as opposed to the door being unfolded forward, there is little concern about the center of mass of the cooking appliance being biased towards the front even when the door 300 is opened. Rather, when the door 300 is opened, the center of mass of the door 300 moves further to the rear than when the door 300 is closed.

In the structure in which the center of mass of the cooking appliance moves to the rear when the door 300 is opened, the risk of the cooking appliance toppling forward when the door 300 is opened is significantly lowered. Also, in the structure, the weight of the tray 200 may be freely increased because the risk of the cooking appliance toppling forward is low even when the weight of the tray is increased. That is, in the above structure, it is possible to use the tray 200 which is thicker and heavier than that used in the structure in which the door unfolds forward.

The thicker and heavier the tray 200 is, the better the high-temperature cooking performance and the easier it is to maintain warmth for a long time. Therefore, better cooking performance may be expected to an extent that the tray 200 is thicker and heavier.

Also, the tray 200 usable in an environment heated by the induction heating part generally weighs more than an ordinary tray. Therefore, when it becomes possible to use the tray 200 which is much thicker and heavier than the ordinary tray, even when the second heating part 600 is provided in the form of an induction heating part, it is possible to provide the tray 200 suitable for the second heating part 600.

Figure 17:
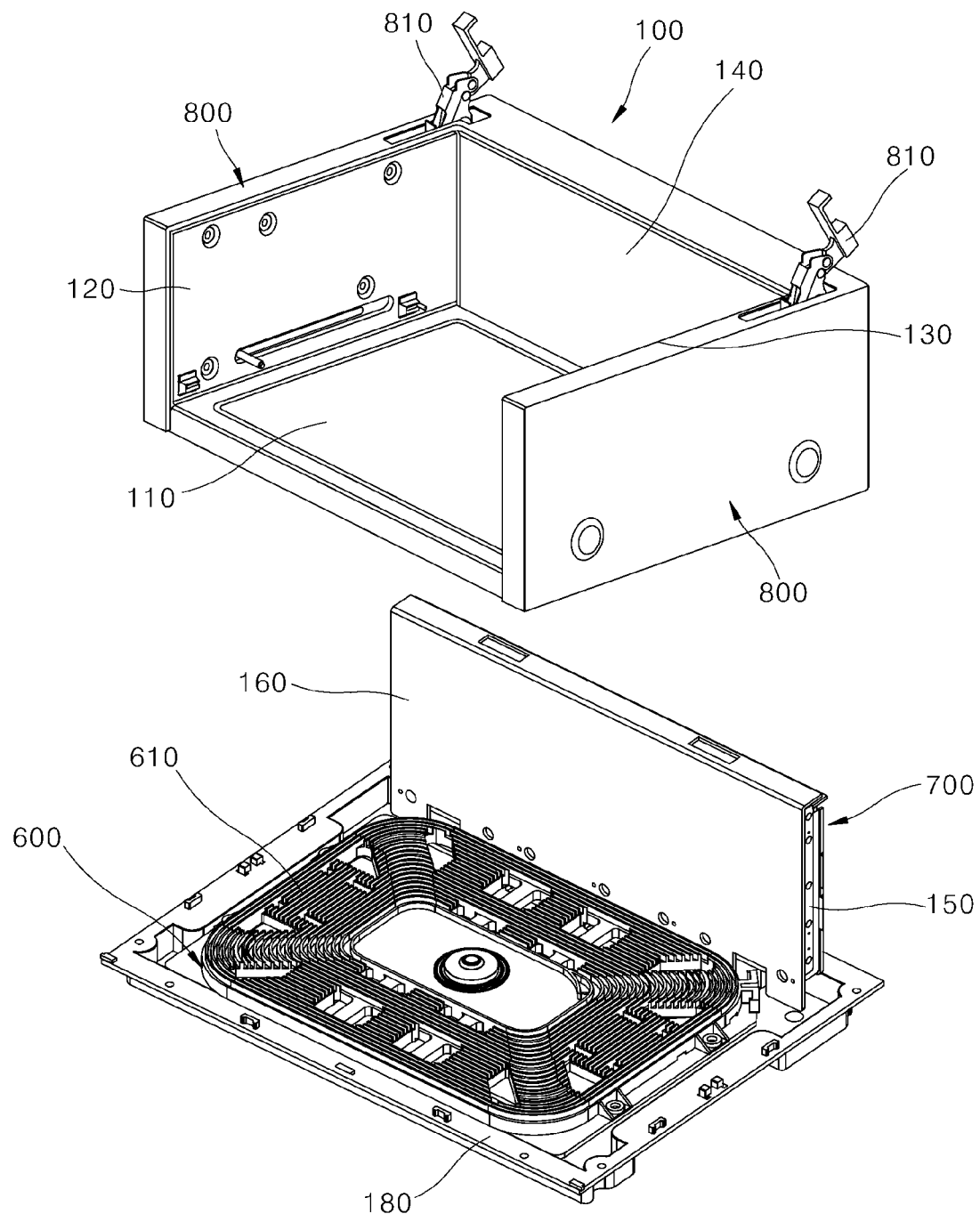
FIG. 17 is an exploded perspective view separately illustrating a housing and a second heating part according to an embodiment of the present invention.
Figure 18:
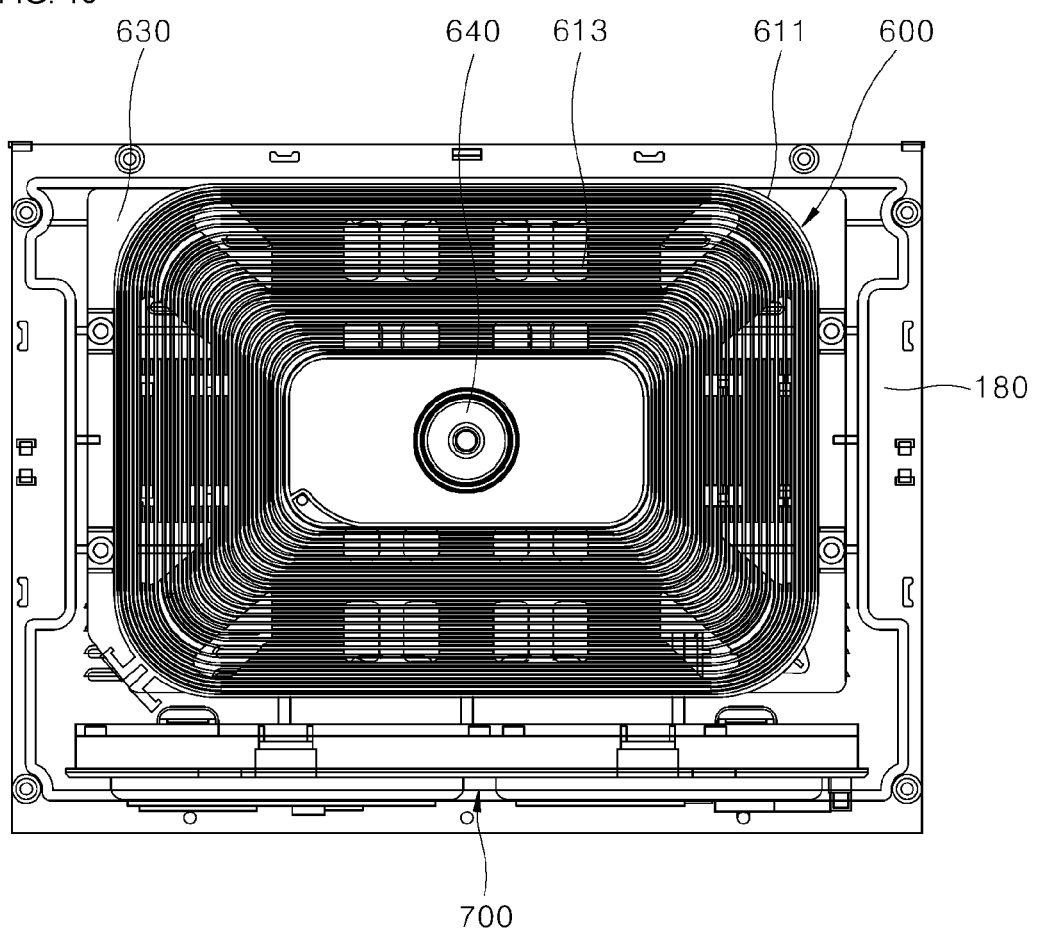
FIG. 18 is a plan view illustrating the second heating part illustrated in FIG. 17.

FIG. 17 is an exploded perspective view separately illustrating a housing and a second heating part according to an embodiment of the present invention, and FIG. 18 is a plan view illustrating the second heating part illustrated in FIG. 17. Also, FIG. 19 is an exploded perspective view separately illustrating the second heating part illustrated in FIG. 17, a receiver coil, and an electromagnetic shielding plate, FIG. 20 is a cross-sectional view showing a coupling state among the second heating part illustrated in FIG. 17, a temperature sensor, the receiver coil, and the electromagnetic shielding plate, and FIG. 21 is a rear view illustrating a second control board illustrated in FIG. 17.

Referring to FIGS. 3, 17, and 18, the second heating part 600 is disposed at the lower portion of the tray 200. The second heating part 600 is installed at the lower portion of the bottom surface 110 of the housing 100 and is provided in the form of a heating part which heats the tray 200 using a different heating method from the first heating part 400, e.g., an induction heating part. The induction heating part may include a working coil 610 installed at the lower portion of the bottom surface 110 of the housing 100 and may induce heating of the tray 200 from the lower portion of the tray 200.

The working coil 610 includes a coil installation base 611. In the present embodiment, the coil installation base 611 is illustrated as being formed in a quadrilateral shape similar to the shape of the tray 200. This is a result of designing the size and shape of the working coil 610 to be similar to those of the tray 200 so that the entire region of the tray 200 may be heated by the working coil 610.

Figure 19:
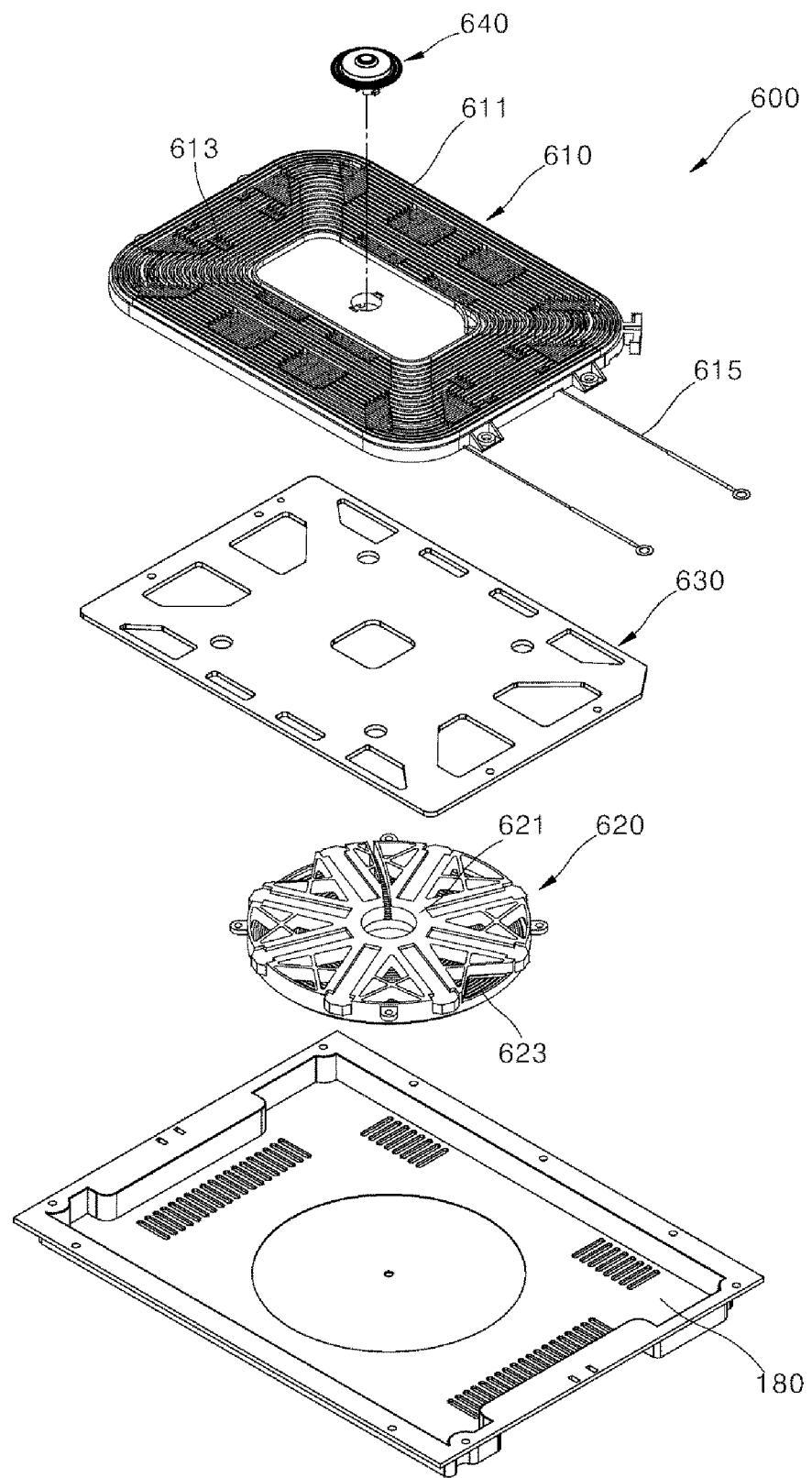
FIG. 19 is an exploded perspective view separately illustrating the second heating part illustrated in FIG. 17, a receiver coil, and an electromagnetic shielding plate.
Figure 20:
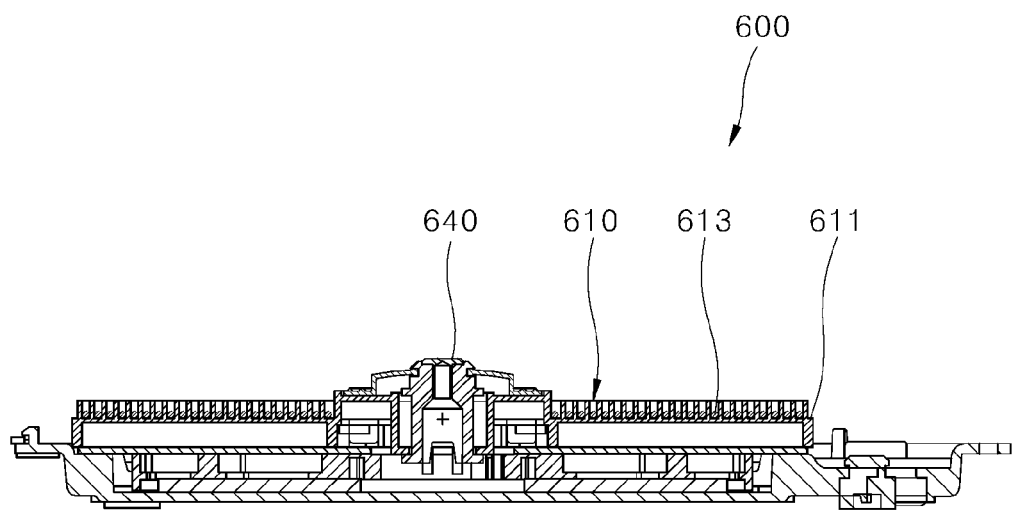
FIG. 20 is a cross-sectional view showing a coupling state among the second heating part illustrated in FIG. 17, a temperature sensor, the receiver coil, and the electromagnetic shielding plate.

As illustrated in FIGS. 19 and 20, the coil installation base 611 has a spiral groove, in which a coil 613 may be installed. The coil 613 is accommodated in the spiral groove and fixed by being densely wound at an upper portion of the coil installation base 611. A coil connection wiring 615 connected to a coil control printed circuit board (PCB) for controlling the coil 613 is provided at an end portion of the coil 613.

Further, the second heating part 600 may further include a receiver coil 620. The receiver coil 620 is an element provided to receive wirelessly-transmitted power and is disposed at a lower portion of the second heating part 600. Also, a base 180 is disposed at a lower portion of the receiver coil 620. The base 180 is coupled to the lower portion of the bottom surface 110 of the housing 100 and supports the working coil 610, the receiver coil 620, and the like from the lower portion of the receiver coil 620 while forming an exterior of the bottom surface of the cooking appliance.

Like the working coil 610, the receiver coil 620 may be formed including a coil installation base 621 and a coil 623. Unlike the coil installation base 611 of the working coil 610, the coil installation base 621 of the receiver coil 620 is formed in a substantially circular shape. This is a result of designing the shape of the receiver coil 620 to be similar to the shape of a working coil of an induction heating part provided at a cooktop.

According to the present embodiment, the receiver coil 620 is provided to be able to receive power from an induction heating part of another cooking appliance, i.e., a cooktop, which is separately provided from the cooking appliance of the present embodiment.

For example, the cooking appliance of the present embodiment may be used while being placed on a cooktop. In this case, power required for operation of the cooking appliance may be received from an induction heating part of the cooktop.

For example, when the working coil of the cooktop and the cooking appliance of the present embodiment are operated together while the cooking appliance of the present embodiment is placed on the cooktop, power supplied through the cooktop may be transmitted to the receiver coil 620.

In this case, current is induced towards the receiver coil 620 through a magnetic field which changes in the working coil of the cooktop due to magnetic induction phenomenon.

In this way, power supplied through the cooktop may be transmitted to the receiver coil 620. In this process, in order to improve power reception efficiency of the receiver coil 620, the cooking appliance of the present embodiment may be placed on the cooktop such that the position of the receiver coil 620 and the position of the working coil provided in the induction heating part of the cooktop overlap with each other in the up-down or vertical direction.

Further, the induction heating part may further include an electromagnetic shielding plate 630 disposed between the working coil 610 and the receiver coil 620. The electromagnetic shielding plate 630 may be provided in the form of a metal plate. The electromagnetic shielding plate 630 is disposed between the working coil 610 and the receiver coil 620 and serves to minimize an influence of electromagnetic interference (EMI) due to the working coil 610 on the receiver coil 620 or an influence of EMI due to the receiver coil 620 on the working coil 610.

The cooking appliance of the present embodiment including the receiver coil 620 may be operated by wirelessly receiving power from the induction heating part of the cooktop. Since the cooking appliance does not require untidy power cables, the cooking appliance may be provided with a simple and neat exterior, and may be operated by wirelessly receiving power just by being placed on the cooktop, and thus the user's satisfaction may be further improved.

As illustrated in FIGS. 17, 18, and 21, the receiver coil 620 is electrically connected to the second control board 700 disposed behind the working coil 610 and the receiver coil 620. The power wirelessly transmitted from the working coil of the cooktop to the receiver coil 620 is transmitted to the second control board 700 electrically connected to the receiver coil 620.

According to the present embodiment, the inner space at the lower portion of the bottom surface 110 of the housing 100 and the inner space at the rear of the back surface 140 of the housing 100 are connected to each other. The working coil 610 of the induction heating part disposed at the lower portion of the bottom surface 110 of the housing 100 and the second control board 700 disposed at the rear of the back surface 140 of the housing 100 may be electrically connected to each other by a cable. The cable connects the working coil 610 and the second control board 700 through the inner space at the lower portion of the bottom surface 110 of the housing 100 and the inner space at the rear of the back surface 140 of the housing 100 which are connected to each other.

A power processing part provided at the second control board 700 supplies power required for operation of the induction heating part and the like of the second heating part 600. The power processing part is connected to the receiver coil 620 and receives power from the receiver coil 620 and processes the received power to a form suitable for use in the second heating part 600 and the like. The power processing part may include a noise filter PCB 710, and a coil control PCB 720 for controlling operation of the working coil 610 may be provided at the second control board 700.

The noise filter PCB 710 serves to remove noise from power to be supplied to the working coil 610, and the coil control PCB 720 controls the operation of the working coil 610. A chip for controlling the operation of the working coil 610, e.g., an insulated gate bipolar transistor (IGBT) chip 725, may be mounted on the coil control PCB 720.

The IGBT chip 725 is a kind of high heat generation chip that may require temperature management. When the IGBT chip 725 is overheated to a predetermined temperature or more, the IGBT chip 725 is unable to control the working coil 610.

In consideration of such aspect, a second cooling fan 730 is installed at the second control board 700. The second cooling fan 730 may be a sirocco fan which sucks air from an outside environment of the housing 100 and discharges the air toward the IGBT chip 725.

The second cooling fan 730 may be disposed at the side of the IGBT chip 725 and may suck air from the rear side of the housing 100 and discharge the air sideward towards the IGBT chip 725.

The air introduced into the space portion at the rear of the back surface of the housing 100 through the second cooling fan 730 may first come into contact with the IGBT chip 725 and a heat sink 726 for cooling the IGBT chip 725, cool the IGBT chip 725 and the heat sink 726, cool a portion of the noise filter PCB 710, and then be discharged to the outside environment.

Meanwhile, as illustrated in FIGS. 17 to 20, the second heating part 600 of the present embodiment may further include a temperature measurement module 640. The temperature measurement module 640 is provided to measure a temperature of the tray or a temperature of the inside of the cooking compartment 105 in which the tray is disposed.

The temperature measurement module 640 may be disposed at the center of the working coil 610. Specifically, the temperature measurement module 640 may be disposed at a portion where the coil 613 is not disposed on the coil installation base 611, e.g., a central portion of the coil installation base 611.

The temperature measurement module 640 may be fitted and coupled to the working coil 610 via a through-hole formed in the central portion of the coil installation base 611. Also, the temperature measurement module 640 installed in this way may be formed including a temperature sensor such as a thermistor and may be disposed at the lower portion of the bottom surface 110 of the housing 100 and measure the temperature of the tray or the temperature of the inside of the cooking compartment 105 in which the tray is disposed.

Referring to FIG. 3 and FIGS. 17 to 21, the hinge assembly 800, the second heating part 600, and the second control board 700 are disposed in the housing 100.

The cooking compartment 105 may be formed inside the housing 100, and the tray 200 may be installed in the cooking compartment so as to be withdrawable therefrom. The second heating part 600 for heating the tray 200 is disposed at the lower portion of the housing 100. Also, the hinge assembly 800 which rotatably supports the door 300 is disposed at each of side portions of the housing 100.

The hinge assembly 800 is disposed at both side portions of the housing 100 in order to stably support the door 300 from both sides of the door 300. Also, the hinge assembly 800 interlocks with the rotation of the door 300 and causes the tray 200 to be withdrawn or inserted. To allow the hinge assembly 800 to be coupled to the tray 200 so that the hinge assembly 800 may move the tray 200 in the front-rear direction, the hinge assembly 800 is disposed at both side portions of the housing 100.

That is, the hinge assembly 800 is disposed at both side portions of the housing 100 for the hinge assembly 800 to be coupled to the tray 200 so that the hinge assembly 800 may stably support the door 300 and move the tray 200 in the front-rear direction.

Further, since the upper surface and the front surface of the housing 100 are open and the second heating part 600 is installed at the lower portion of the housing 100, the hinge assembly 800 may be disposed at the rear or both side portions of the housing 100. Due to the above-described reasons, in many ways, it is advantageous for the hinge assembly 800 to be disposed at both side portions of the housing 100.

The receiver coil 620 is disposed at the lower portion of the housing 100, more specifically, at the lower portion of the second heating part 600. Since the receiver coil 620 is disposed at a position most adjacent to a target of wireless power transmission, e.g., the working coil of the cooktop, the receiver coil 620 may be disposed at the lower portion of the housing 100.

When the receiver coil 620 is disposed at the lower portion of the housing 100 together with the working coil 610 of the second heating part 600 as described above, the EMI of the working coil 610 or the receiver coil 620 may affect each other. In consideration of such aspect, the electromagnetic shielding plate 630 may be disposed between the working coil 610 and the receiver coil 620.

Since the second control board 700 is an element closely related to power reception through the receiver coil 620 and the operation of the working coil 610, the second control board 700 may be disposed at a position adjacent to the receiver coil 620 and the working coil 610.

Since the second heating part 600 and the receiver coil 620 are disposed at the lower portion of the housing 100, and the hinge assembly 800 is disposed at both side portions of the housing 100, the rear of the housing 100 may be the most suitable position for arrangement of the second control board 700.

In consideration of such aspect, the second control board 700 may be installed in a space at the rear of the back surface 140 of the housing 100. The second control board 700 installed in this way may be disposed at a position very close to the working coil 610 and the receiver coil 620. Accordingly, wires for connecting the second control board 700, the working coil 610, and the receiver coil 620 may be simply configured.

Also, the position of the second control board 700 disposed at the rear of the housing 100 as described above is also close to the hinge assembly 800. Accordingly, when configuring wires for connecting the second control board 700 and the elements disposed in the door 300, the wires may be easily concealed inside the hinge assembly 800. There is an advantage in that it is possible to configure the wires in a neat and simple manner such that the wires are not easily exposed to the outside.

As described above, the second heating part 600 and the receiver coil 620, the hinge assembly 800, and the second control board 700 are disposed at the lower portion of the housing 100, both side portions of the housing 100, and the rear of the housing 100, respectively. The elements are those suitable to be disposed in the housing 100 and are disposed at optimal positions that allow the elements to function optimally, have high structural stability, have neat and simple wiring configurations, and efficiently avoid interference therebetween.

Meanwhile, referring to FIGS. 5 to 9, the see-through window W, the first heating part 400, the input part 360, and the first control board 500 are disposed in the door 300. The elements are those more suitable to be disposed in the door 300 than in the housing 100 due to functions thereof. Also in consideration of an aspect that various other elements are already disposed in the housing 100 and thus it is difficult for other elements to be disposed in the housing 100, the see-through window W, the first heating part 400, the input part 360, and the first control board 500 are more suitable to be disposed in the door 300 than in the housing 100.

The see-through window W is disposed at the upper portion of the cooking appliance. In consideration of a characteristic of the cooking appliance provided in the form of a mini oven in that the cooking appliance is generally used at a position lower than a user's gaze, the see-through window W may be disposed at the upper portion of the cooking appliance rather than being disposed at the front of the cooking appliance.

The see-through window W is disposed at the upper surface of the door 300, more specifically, at the door upper surface part 310. In this case, the larger the size of the see-through window W, the more advantageous it is for securing the field of view for the inside of the cooking compartment 105. However, the size of the see-through window W may be set to a size that allows a space required for installation of the first heating part 400 and the cable mounting parts 340 and 345 to be secured in the door upper surface part 310.

Like the see-through window W, the first heating part 400 is disposed in the door upper surface part 310. This is a result of designing the first heating part 400 to be disposed at an upper portion facing the second heating part 600 with the tray 200 disposed therebetween. That is, the first heating part 400 is disposed on the door upper surface part 310 so as to be disposed higher than the tray 200.

The first heating part 400 installed in the door upper surface part 310 together with the see-through window W as described above may be disposed at a position at which the first heating part 400 is not exposed through the see-through window W when viewed from the top. When the first heating part 400 is disposed in a region exposed through the see-through window W, it is aesthetically not pleasing, a problem may occur in securing the field of view through the see-through window W, and a problem that the temperature of a portion of the see-through window W rises may also occur.

Also, in consideration of the shape of the door front surface part 350 having a rectangular shape in which a front-rear length is longer than a left-right length, the first heating part 400 may be disposed at the front outer side and the rear outer side of the see-through window W so that a length of the first heating part 400 may be increased accordingly, and improvement in thermal power of the first heating part 400 may be expected as much as the increase in the length of the first heating part 400.

In consideration of such aspects, the first heating part 400 is disposed at each of the front outer side and the rear outer side of the see-through window W. In this way, it may be advantageous to secure functional advantages such as maintaining aesthetics, maintaining a secured field of view, suppressing a temperature rise of the see-through window W, and improving thermal power of the first heating part 400.

Since the see-through window W and the first heating part 400 are disposed in the door upper surface part 310 as described above, most of the region of the door upper surface part 310 is occupied by the see-through window W and the first heating part 400. Also, the input part 360 and the first control board 500 are disposed in the door front surface part 350 instead of the door upper surface part 310.

In consideration of the state in which most of the region of the door upper surface part 310 is occupied by the see-through window W and the first heating part 400, it is not easy to secure a space for installing the input part 360 in the door upper surface part 310. Also, when the input part 360 is disposed in the door upper surface part 310, in the process of opening the door 300, a collision may occur between the input part 360 and an obstacle disposed at the upper portion of the cooking appliance, and there is a risk of damage of the input part 360. Particularly, when the input part 360 is provided in the form protruding from the door 300, the risk is even greater.

Also, the door upper surface part 310 in which the first heating part 400 is disposed is likely to have a higher temperature than the door front surface part 350. Considering that the input part 360 is an element held by the user's hand and manipulated, when the input part 360 is disposed in the door upper surface part 310, the possibility that the user will come into contact with a hot portion of the door upper surface part 310 in the process of manipulating the input part 360 may be increased. That is, when the input part 360 is disposed in the door upper surface part 310, a risk that the user will suffer an injury such as a burn in the process of manipulating the input part 360 may be increased.

In consideration of such aspect, the input part 360 is disposed in the door front surface part 350 instead of the door upper surface part 310. Since the input part 360 is disposed in the door front surface part 350, the user may safely and conveniently control the operation of the cooking appliance from the front of the cooking appliance.

In addition to the input part 360, the first control board 500 is also disposed in the door front surface part 350. Various elements and circuits related to reception of manipulation signals input via the input part 360, generation of control signals for controlling operations of the first heating part 400 and the second heating part 600, and the like may be provided in the first control board 500. Therefore, in particular, the first control board 500 may be electrically connected to the input part 360.

According to the present embodiment, like the input part 360, the first control board 500 is installed in the door front surface part 350 and disposed at a position very close to the input part 360. Therefore, connection between the input part 360 and the first control board 500 may be configured in the form in which the input part 360 is directly connected to the first control board 500, and, accordingly, a very simple and stable connection structure may be provided for the input part 360 and the first control board 500.

Also, since the first control board 500 is installed in the door front surface part 350 instead of the door upper surface part 310 in which the first heating part 400, which is a heat generating component, is disposed, the first control board 500 may be disposed at a position deviated, to some extent, from an influence of heat generated by the first heating part 400. In this way, since an influence of heat, which is generated during operation of the first heating part 400, on the first control board 500 may be reduced accordingly, and the stability and operational reliability of the cooking appliance may be further improved.

According to a cooking appliance of the embodiments of the present invention, since a door is provided to be able to open both a front surface and an upper surface of a cooking compartment by rotating upward without being unfolded forward, opening of the door may be easily and smoothly performed even in a narrow space and the withdrawal of food or a tray may be more easily and conveniently performed.

Since both the front surface and the upper surface of the cooking compartment may be opened by the door and a tray part is exposed to a greater extent due to the opening of the door, an object to be cooked may be easily put in or taken out even when only a portion of the tray is withdrawn. Thus, improved convenience and stability may be provided.

In the embodiments of the present invention, since an expanded passage is provided so that a user may easily and conveniently insert or withdraw food or the tray into or from the cooking compartment and, at the same time, the tray is allowed to be automatically withdrawn or inserted when the door is opened or closed, a function of allowing the withdrawal and insertion of food or the tray to be more easily and conveniently performed may be provided.

According to the embodiments of the present invention, since the door is provided to be opened by rotating upward without being unfolded forward, there is little concern about the center of mass of the cooking appliance being biased toward the front even when the door is opened. Accordingly, there is an advantageous effect in that the risk of the cooking appliance toppling forward is significantly lowered.

The embodiments of the present invention may provide a cooking appliance having a stable structure in which the risk of the cooking appliance toppling forward is significantly low. In this way, there is an advantage in that it is possible to freely adopt a tray whose thickness and weight are increased to improve the cooking performance or a tray which is usable in an environment being heated by an induction heating part.

According to the embodiments of the present invention, since elements constituting the cooking appliance may function optimally, the structural stability of the elements may be high, a wiring configuration of the elements may be neat and simple, and the elements may be disposed at optimal positions for efficiently avoiding interference therebetween. The cooking appliance may have a compact exterior, structural stability and operational reliability, and high safety may be provided.

The embodiments of the present invention have been described above with reference to the drawings, but the embodiments are merely illustrative. Those of ordinary skill in the art understands that various modifications and other equivalent embodiments are possible from the above embodiments. Therefore, the actual technical scope of the embodiments of the present invention should be defined by the claims below.

A cooking appliance according to at least one embodiment of the present invention for achieving one or more objectives includes a housing with open upper and front surfaces and a door which rotates about a rear side thereof connected to the housing to open and close the upper surface and the front surface of the housing.

The door may open a front surface and an upper surface of a cooking compartment by rotating upward without being unfolded forward.

The cooking appliance according to at least one embodiment of the present invention includes: the housing having the cooking compartment, which is surrounded by a bottom surface, both side surfaces, and a back surface of the housing, formed therein and having the open upper and front surfaces; the door including a door upper surface part which covers the upper surface of the housing and a door front surface part which is connected to a front side of the door upper surface part and covers the front surface of the housing and opening and closing the upper surface and the front surface of the housing by rotating about a rear side of the door upper surface part; a tray disposed in the cooking compartment; and a heating part installed in the housing or the door to heat the tray.

The cooking appliance having the above configuration includes the door which is able to open both the front surface and the upper surface of the cooking compartment by rotating upward without being unfolded forward. In this way, there are advantageous effects in that the opening of the door may be easily and smoothly performed even in a narrow space and the withdrawal of food or the tray may be more easily and conveniently performed.

In a conventional door structure of a cooking appliance in which only a front surface of a cooking compartment is opened, since movement of an object to be cooked may be limited or the field of view is occluded by an upper surface of a case, for putting the object to be cooked in a tray or taking the object to be cooked out of the tray, the tray has to be withdrawn forward to a great extent so that the object to be cooked is exposed, and thus a risk of the cooking appliance toppling forward is high. On the other hand, according to at least one embodiment of the present invention, since both the front surface and the upper surface of the cooking compartment may be opened by the door and a tray part is exposed to a greater extent due to the opening of the door, an object to be cooked may be easily put in or taken out even when only a portion of the tray is withdrawn. Thus, improved convenience and stability may be provided.

Also, according to at least one embodiment of the present invention, a first heating part may include an electric heater installed at the door upper surface part and disposed at an upper portion of the tray, the cooking appliance may further include an input part disposed at the door front surface part and a first control board disposed at the door front surface part, an inside of the door upper surface part and an inside of the door front surface part may be connected to each other, and the first control board may be electrically connected to the input part and the first heating part through the inside of the door upper surface part and the inside of the door front surface part which are connected to each other.

By such a configuration, elements suitable to be disposed in the door may be disposed at optimal positions that allow the elements to function optimally, have high structural stability, have neat and simple wiring configurations, and efficiently avoid interference therebetween.

According to at least one embodiment of the present invention, the door may further include a see-through window disposed at the door upper surface part, and the first heating part may be disposed in a region in which, when viewed from the top, the first heating part is not exposed through the see-through window.

By such a configuration, since a user may view the inside of the cooking compartment from the top through the see-through window formed at an upper portion of the cooking appliance, there is an advantageous effect in that the user is allowed to easily and conveniently check a cooking state of food without lowering the posture or bending the waist forward.

According to at least one embodiment of the present invention, the door may further include a see-through window disposed at the door upper surface part, the see-through window may include a pair of glasses disposed to be spaced a predetermined distance apart from each other in an up-down or vertical direction so that a space portion is formed in the see-through window, the first heating part may include an electric heater installed at the door upper surface part and disposed at an upper portion of the tray, the cooking appliance may further include an input part disposed at the door front surface part and a first control board disposed at the door front surface part, a space portion which accommodates at least a portion of the input part and the first control board therein may be formed in the door front surface part, the space portion formed inside the door front surface part and the space portion formed inside the see-through window may be connected to each other, and an air intake port which opens the space portion inside the door front surface part to the outside may be formed at a lower end of the door front surface part, and an air exhaust port which opens the space portion inside the see-through window to the outside may be formed at a rear end of the door upper surface part.

By such a configuration, there are advantageous effects in that, since the occurrence of overheating and deterioration of components inside the door such as the first control board is suppressed, the occurrence of breakdown of the cooking appliance, deterioration of performance of the cooking appliance, etc., may be effectively suppressed, and the occurrence of accidents in which a user suffers an injury such as a burn due to coming into contact with the see-through window may be effectively reduced.

According to at least one embodiment of the present invention, the heating part may include a second heating part disposed at a lower portion of the tray, the second heating part may include an induction heating part installed at the bottom surface of the housing, an inner space at a lower portion of the bottom surface of the housing and an inner space at the rear of the back surface of the housing may be connected to each other, and the cooking appliance may further include a second control board which is installed at the back surface of the housing and electrically connected to the induction heating part through the inner space at the lower portion of the bottom surface of the housing and the inner space at the rear of the back surface of the housing which are connected to each other.

By such a configuration, elements suitable to be disposed in the housing may be disposed at optimal positions that allow the elements to function optimally, have high structural stability, have neat and simple wiring configurations, and efficiently avoid interference therebetween.

According to at least one embodiment of the present invention, the second heating part may further include a receiver coil which is disposed at a lower portion of the second heating part and receives wirelessly-transmitted power, the induction heating part may include a working coil which is installed at the lower portion of the bottom surface of the housing and inductively heats an upper portion of the bottom surface of the housing, the second control board may include a chip which controls the working coil and a power processing part to which the power is supplied, and the receiver coil may be electrically connected to the second control board.

By such a configuration, since the cooking appliance does not require untidy power cables, the cooking appliance may be provided in a simple and neat exterior. The cooking appliance may be operated by wirelessly receiving power just by being placed on a cooktop, and the user's satisfaction may be further improved.

At least one embodiment of the present invention may further include a hinge assembly which withdraws the tray forward from the inside of the cooking compartment by interlocking with rotation of the door when the door is opened and inserts the tray rearward toward the inside of the cooking compartment by interlocking with rotation of the door when the door is closed.

By such a configuration, since the tray may be automatically withdrawn or inserted when the door is opened or closed, a function of allowing the withdrawal and insertion of food or the tray to be more easily and conveniently performed may be provided.

At least one embodiment of the present invention is directed to providing a cooking appliance having a low risk of toppling forward when a door is opened and capable of facilitating insertion and withdrawal of shelves.

At least one embodiment of the present invention is also directed to providing a cooking appliance having high structural stability and capable of facilitating checking of a cooking state.

What is claimed is:

1. A cooking appliance comprising:
a housing having a cooking compartment, the housing including a bottom surface, a pair of side surfaces, and a back surface, and having an upper surface and a front surface which are open;
a door including a door upper surface part which covers the upper surface of the housing and a door front surface part which is connected to a front side of the door upper surface part and covers the front surface of the housing, the door rotatable about a rear side of the door upper surface part to open and close the upper surface and the front surface of the housing; and
a heating part installed at at least one of the housing or the door,
wherein an inside of the door upper surface part includes a first space portion and an inside of the door front surface part includes a second space portion, the first space portion and the second space portion are connected to each other,
wherein a first control board is disposed in the second space portion of the door front surface part,
wherein the heating part includes a first heating part including an electric heater installed at the door upper surface part, and the first control board is electrically connected to the first heating part through the first space portion of the door upper surface part.

2. The cooking appliance of claim 1, further comprising:
an input part disposed at the door front surface part,
wherein the first control board is electrically connected to the input part through the inside of the door front surface part.

3. The cooking appliance of claim 1, wherein:
the door further includes a see-through window disposed at the door upper surface part; and
the first heating part is installed at the door upper surface part and disposed in a region such that, when viewed from the top of the door upper surface part and into the cooking compartment, the first heating part is not exposed through the see-through window.

4. The cooking appliance of claim 3, wherein the first heating part is disposed at each of a front outer side and a rear outer side of the see-through window.

5. The cooking appliance comprising:
a housing having a cooking compartment, the housing including a bottom surface, a pair of side surfaces, and a back surface, and having an upper surface and a front surface which are open;
a door including a door upper surface part which covers the upper surface of the housing and a door front surface part which is connected to a front side of the door upper surface part and covers the front surface of the housing, the door rotatable about a rear side of the door upper surface part to open and close the upper surface and the front surface of the housing; and
a heating part installed at at least one of the housing or the door,
wherein an inside of the door upper surface part includes a first space portion and an inside of the door front surface part includes a second space portion, the first space portion and the second space portion are connected to each other,
wherein a first control board is disposed in the second space portion of the door front surface part,
wherein the door further includes a see-through window disposed at the door upper surface part; and
the first heating part is installed at the door upper surface part and disposed in a region such that, when viewed from the top of the door upper surface part and into the cooking compartment, the first heating part is not exposed through the see-through window,
wherein the heating part includes a first heating part including an electric heater installed at the door upper surface part, and cable mounting parts disposed in the first space portion of the door upper surface part and at outer sides of the see-through window.

6. The cooking appliance of claim 5, further comprising:
at least a portion of a power cable which supplies power to the first heating part and the first control board is installed at one of the cable mounting parts;
at least a portion of a signal cable which transmits a control signal generated in the first control board to the first heating part is installed at the other one of the cable mounting parts; wherein the power cable and the signal cable are disposed to be spaced apart from each other in the door upper surface part with the see-through window disposed therebetween.

7. The cooking appliance of claim 6, wherein:
the heating part includes a second heating part disposed at the bottom surface of the housing;
a second control board disposed at the back surface of the housing; and
a hinge assembly disposed at a rear side of the door upper surface part and configured to rotatably connect the door and the housing,
wherein the power cable and the signal cable pass between the housing and the door through an inside of the hinge assembly.

8. The cooking appliance of claim 7, wherein:
the hinge assembly is disposed at each of the side surfaces of the housing;
the power cable passes through the inside of one of the hinge assemblies disposed at the side surfaces of the housing; and
the signal cable passes through the inside of the other one of the hinge assemblies disposed at the side surfaces of the housing.

9. The cooking appliance of claim 1, wherein:
the door further includes a see-through window disposed at the door upper surface part;
the see-through window including a pair of glasses disposed to be spaced a predetermined distance apart from each other in an up-down direction and forming a space portion between the pair of glasses of the see-through window;
the first heating part installed at the door upper surface part;
an input part disposed at the door front surface part and a first control board disposed at the door front surface part;
the door front surface part including a space portion which accommodates at least a portion of the input part and the first control board therein, and
the space portion of the door front surface part and the space portion of the see-through window are connected to each other;

an air intake port at an end of the door front surface part which opens the space portion of the door front surface part to the outside environment; and an air exhaust port at an end of the door upper surface part which opens the space portion inside the see-through window to the outside environment.

10. The cooking appliance of claim 9, further comprising a cooling fan which generates a flow of air which causes outside air to be introduced into the door via the air intake port and causes air inside the door to be discharged via the air exhaust port.

11. The cooking appliance of claim 1, wherein the heating part includes a second heating part disposed at the bottom surface of the housing.

12. The cooking appliance of claim 11, wherein:
the second heating part includes an induction heating part installed at the bottom surface of the housing;
the bottom surface of the housing including an inner space and the back surface of the housing including an inner space, the inner spacing of the bottom surface of the housing and the inner space of the back surface of the housing are connected to each other; and
a second control board installed at the inner space of the back surface of the housing and electrically connected to the induction heating part through the inner space of the bottom surface of the housing.

13. The cooking appliance of claim 12, wherein:
the induction heating part includes a working coil installed at the bottom surface of the housing to inductively heat from the bottom surface of the housing; and
the second control board includes a chip which controls the working coil and a power processing part.

14. The cooking appliance of claim 12, wherein the second part includes a receiver coil to receive wirelessly-transmitted power, wherein the receiver coil is electrically connected to the second control board.

15. The cooking appliance of claim 14, further comprising an electromagnetic shielding plate disposed between the working coil and the receiver coil.

16. The cooking appliance of claim 1, further comprising:
a tray; and
a hinge assembly interlocked with a rotation of the door, wherein the hinge assembly withdraws the tray forward from the inside of the cooking compartment when the door is opened and inserts the tray rearward toward the inside of the cooking compartment when the door is closed.

17. The cooking appliance of claim 16, wherein the hinge assembly includes:
a hinge part hinge-coupled to the rear side of the door upper surface part and whose state is changed by interlocking with the rotation of the door; and
a mounting protrusion configured to have the tray mounted thereon, which moves in a front-rear direction by interlocking with the change in the state of the hinge part to move the tray in the front-rear direction.

18. The cooking appliance of claim 17, further comprising a second heating part disposed at the bottom surface of the housing and a second control board disposed at the back surface of the housing and electrically connected to the second heating part,
wherein the hinge assembly is disposed at each of side surfaces of the housing, and
the mounting protrusion passes through the side surface of the housing and protrudes toward the inside of the cooking compartment.

* * * * *